United States Patent
Seo et al.

(10) Patent No.: US 7,613,384 B2
(45) Date of Patent: Nov. 3, 2009

(54) METHOD FOR CONFIGURING COMPOSITE FILE STRUCTURE FOR DATA REPRODUCTION, AND METHOD AND APPARATUS FOR REPRODUCING DATA USING THE COMPOSITE FILE STRUCTURE

(75) Inventors: Kang Soo Seo, Anyang-si (KR); Jea Yong Yoo, Seoul (KR); Byung Jin Kim, Seongnam-si (KR); Seung Hoon Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 938 days.

(21) Appl. No.: 11/205,101

(22) Filed: Aug. 17, 2005

(65) Prior Publication Data

US 2006/0039255 A1  Feb. 23, 2006

Related U.S. Application Data

(60) Provisional application No. 60/601,993, filed on Aug. 17, 2004.

(30) Foreign Application Priority Data

Sep. 15, 2004  (KR) .................. 10-2004-0073794

(51) Int. Cl.
*H04N 5/00* (2006.01)
*H04N 5/93* (2006.01)
(52) U.S. Cl. ..................................... 386/125; 386/55
(58) Field of Classification Search .............. 386/125, 386/124, 68, 95, 46, 67, 55, 52
See application file for complete search history.

(56) References Cited

U.S. PATENT DOCUMENTS

| | | | |
|---|---|---|---|
| 5,644,782 A | 7/1997 | Yeates et al. |
| 5,930,768 A | 7/1999 | Hooban |
| 5,982,980 A | 11/1999 | Tada |
| 6,021,438 A | 2/2000 | Duvvoori et al. |
| 6,269,371 B1 | 7/2001 | Ohnishi |
| 6,775,803 B1 | 8/2004 | Chung et al. |

(Continued)

FOREIGN PATENT DOCUMENTS

CA  2373641  9/2001

(Continued)

OTHER PUBLICATIONS

Chinese Office Action corresponding to Chinese Application No. 200580031490.0 dated Aug. 8, 2008.

(Continued)

*Primary Examiner*—Robert Chevalier
(74) *Attorney, Agent, or Firm*—Harness, Dickey & Pierce

(57) ABSTRACT

A method and apparatus for reproducing data is disclosed. The method and apparatus configures a composite file structure to simultaneously reproduce data recorded in a recording medium and other data recorded in a local storage, and reproduces data using the configured composite file structure. A variety of methods for configuring the composite file structure are described in preferred embodiments, such that a method for effectively configuring the composite file structure regardless of a current condition state is given. Therefore, data recorded in the recording medium and other data stored in the local storage can be effectively used.

32 Claims, 40 Drawing Sheets

U.S. PATENT DOCUMENTS

| | | | |
|---|---|---|---|
| 6,928,613 B1 | 8/2005 | Ishii et al. | |
| 7,308,189 B2 * | 12/2007 | Ando et al. | 386/68 |
| 2002/0161571 A1 | 10/2002 | Matsushima et al. | |
| 2003/0072453 A1 | 4/2003 | Kelly et al. | |
| 2003/0105743 A1 | 6/2003 | Ireton | |
| 2003/0190148 A1 * | 10/2003 | Lee | 386/70 |
| 2003/0202431 A1 | 10/2003 | Kim et al. | |
| 2003/0228134 A1 | 12/2003 | Kim et al. | |
| 2003/0235402 A1 | 12/2003 | Seo et al. | |
| 2003/0235406 A1 | 12/2003 | Seo et al. | |
| 2004/0047588 A1 | 3/2004 | Okada et al. | |
| 2004/0051812 A1 | 3/2004 | Hayward | |
| 2004/0054541 A1 | 3/2004 | Kryze et al. | |
| 2004/0081434 A1 | 4/2004 | Jung et al. | |
| 2004/0101285 A1 | 5/2004 | Seo et al. | |
| 2004/0184778 A1 | 9/2004 | Jung et al. | |
| 2004/0210584 A1 | 10/2004 | Nir et al. | |
| 2004/0235402 A1 | 11/2004 | Bjelopavlic et al. | |
| 2005/0025461 A1 | 2/2005 | Kato et al. | |
| 2005/0105888 A1 | 5/2005 | Hamada et al. | |
| 2005/0108466 A1 | 5/2005 | Takashima et al. | |
| 2005/0196142 A1 | 9/2005 | Park et al. | |
| 2005/0198071 A1 | 9/2005 | Yoo et al. | |
| 2005/0198115 A1 | 9/2005 | Sugimoto et al. | |
| 2006/0013562 A1 | 1/2006 | Sugino et al. | |
| 2006/0045481 A1 | 3/2006 | Yahata et al. | |
| 2006/0051062 A1 | 3/2006 | Kusaka et al. | |
| 2006/0140079 A1 | 6/2006 | Hamada et al. | |
| 2006/0143666 A1 | 6/2006 | Okada et al. | |
| 2006/0153535 A1 | 7/2006 | Chun et al. | |
| 2006/0227973 A1 | 10/2006 | Takashima et al. | |
| 2006/0282775 A1 | 12/2006 | Yahata et al. | |
| 2007/0217305 A1 * | 9/2007 | Seo et al. | 369/47.1 |

FOREIGN PATENT DOCUMENTS

| | | |
|---|---|---|
| CN | 1111873 | 11/1995 |
| CN | 1179589 | 4/1998 |
| CN | 1898742 A | 1/2007 |
| EP | 0 737 912 | 10/1996 |
| EP | 0 737 975 | 10/1996 |
| EP | 0 801 384 | 10/1997 |
| EP | 1 032 229 | 8/2000 |
| EP | 1 408 505 | 4/2004 |
| EP | 1426961 A1 | 6/2004 |
| EP | 1437737 A2 | 7/2004 |
| EP | 1 513 152 | 3/2005 |
| EP | 1 524 669 | 4/2005 |
| EP | 1 536 427 | 6/2005 |
| EP | 1 553 769 | 7/2005 |
| EP | 1 718 074 | 11/2006 |
| JP | 11-065996 | 3/1999 |
| JP | 11-249948 | 9/1999 |
| JP | 11-249963 | 9/1999 |
| JP | 11-288580 | 10/1999 |
| JP | 2002288941 | 10/2002 |
| JP | 2004-214918 | 7/2004 |
| JP | 2006-040473 | 2/2006 |
| KR | 10-2004-0039885 | 5/2004 |
| RU | 2233011 | 7/2004 |
| TW | 583538 | 4/2004 |
| WO | WO 95/12197 | 5/1995 |
| WO | WO 96/11446 | 4/1996 |
| WO | WO 01/67668 | 9/2001 |
| WO | WO 2004/001752 | 12/2003 |
| WO | WO 2004/001754 | 12/2003 |
| WO | WO 2004/023479 | 3/2004 |
| WO | WO 2004/030356 | 4/2004 |
| WO | WO 2004/042723 | 5/2004 |
| WO | WO 2004/047100 | 6/2004 |
| WO | WO 2004/047104 | 6/2004 |
| WO | WO 2005/002220 | 6/2004 |
| WO | WO 2004/074976 | 9/2004 |
| WO | WO 2004/077436 | 9/2004 |
| WO | WO 2005/052941 | 9/2004 |
| WO | WO 2004/114658 | 12/2004 |
| WO | WO 2005/078727 | 2/2005 |
| WO | WO 2005/050528 | 6/2005 |
| WO | WO 2005/055205 | 6/2005 |
| WO | WO 2005/091637 | 9/2005 |
| WO | WO 2005/124763 | 12/2005 |

OTHER PUBLICATIONS

European Search Report corresponding to European Application No. 05787044.6 dated Jan. 29, 2009.

International Search report for PCT/KR 2005/002696 dated Dec. 5, 2005.

International Search report for PCT/KR 2005/002698 dated Dec. 5, 2005.

International Search report for PCT/KR 2005/002704 dated Dec. 30, 2005.

International Search report for PCT/KR 2005/002700 dated Jan. 13, 2006.

Office Action for Chinese Application 1111873 dated May 8, 2009 and English translation thereof.

Office Action for Chinese Application 1179589 dated May 8, 2009 and English translation thereof.

Notice of Allowance for Russian Application 2233011 dated Apr. 28, 2009 and English translation thereof.

* cited by examiner

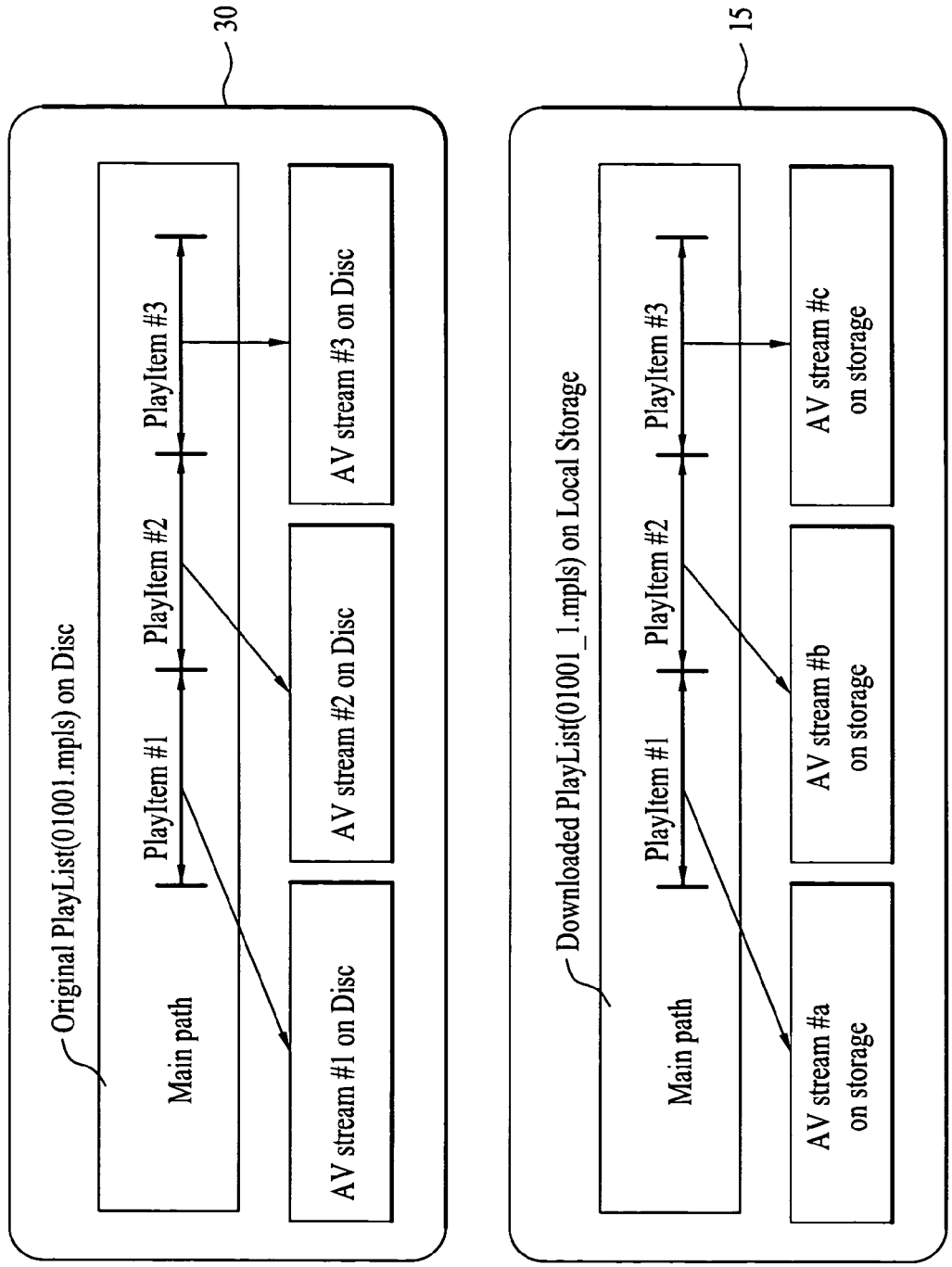

file structure and stream Recorded in disc downloaded file structure and stream stored in Local storage downloaded file structure and stream stored in Local storage New file structure and stream (composite)

FIG. 14A

```
index.bdmv
        type_indicator
        version_number
        Indexes_start_address
        reserved_for_future_use
        ApplnfoBDMV()
        for(i=0; i<N1; i++) {
                padding_word
        }
        Indexes()
        for (i=0; i<N2; i++) {
                padding_word
        }
}
```

FIG. 14B

```
Indexes() {
    length
    FirstPlayback() {
        reserved_for_future_use
        FirstPlayback_mobj_id_ref
    }
    TopMenu() {
        reserved_for_future_use
        TopMenu_mobj_id_ref
    }
    number_of_Title
    for (title_id=0;
        title_id<number_of_Titles;
        title_id++) {
            Title[title_id]() {
                title_playback_type      [title_id]
                Title_access_type        [title_id]
                reserved_for_future_use
                Title_mobj_id_ref        [title_id]
            }
        }
}
```

{ type 1 : main Title recorded in disc
  type 2 : Aux Title stored in local storage
  type 3 : composite Title (disc+local storage)

FIG. 14C

```
MovieObject.bdmv {
        type_indicator
        version_number
        reserved_for_future_use
        MovieObjects()  ———▶ navigation_command(mobj_id)
        for (i=0; i<N1; i++) {
                    padding_word
        }
}
```

FIG. 15A

```
xxxxx.mpls{
        type_indicator
        version_number
        PlayList_start_address
        PlayListMark_start_address
        reserved_for_future_use
        ApplnfoPlayList()
        for(i=0; i<N1; i++) {
                    padding_word
        }
        PlayList()
        for(i=0; i<N2; i++) {
                    padding_word
        }
        PlayListMark()
        for(i=0; i<N2; i++) {
                    padding_word
        }
}
```

FIG. 15B

```
PlayList() {
    length
    reserved_for_future_use
    number_of_PlayItems
    number_of_SubPaths
    for (PlayItem_id=0;
            PlayItem_id<number_of_PlayItems;
            PlayItem_id++) {
        PlayItem()    ⟶ STN_table()
    }
    for(SubPath_id=0;
            SubPath_id<number_of_SubPaths;
            SubPath_id++) {
        SubPath()
    }
}
```

FIG. 15C

```
STN_table() {
  length
  reserved_for_future_use
  number_of_video_stream_entries
  number_of_audio_stream_entries
  number_of_PG_textST_stream_entries
  number_of_IG_stream_entries
  reserved_for_future_use
  for (video_stream_id=0;
       video_stream_id<number_of_video_stream_entries;
       video_stream_id++) {
         stream_entry()
         stream_attributes()
  }
  for (audio_stream_id=0;
       audio_stream_id<number_of_audio_stream_entries;
       audio_stream_id++) {
         stream_entry()
         stream_attributes()
  }
  for (PG_textST_id=0;
       PG_textST_id<number_of_PG_textST_stream_entries;
       PG_textST_stream_id++) {
         stream_entry()
         stream_attributes()
  }
  for (IG_stream_id=0;
       IG_stream_id<number_of_IG_stream_entries
       IG_stream_id++) {
         stream_entry()
         stream_attributes()
  }
}
```

FIG. 15E

```
stream_attributes() {
    length
    stream_coding_type
    if(stream_doding_type==0x02) {
            reserved_for_future_use
            frame_rate
            reserved_for_future_use
    } else if (stream_coding_type==0x80          ||
            stream_coding_type==0x81             ||
            stream_coding_type==0x82) {
            audio_presentation_type
            reserved_for_future_use
            audio_language_code
    } else if (stream_coding_type==0x90) {
                        // Presentation graphics stream
            PG_languge_code
    } else if (stream_coding_type==0x91) {
                        // Interactive graphics stream
            IG_languge_code
    } else if (stream_coding_type==0x92) {
                        // Text subtitle stream
            character_code
            reserved_for_future_use
            textST_language_code
    }
}
```

METHOD FOR CONFIGURING COMPOSITE FILE STRUCTURE FOR DATA REPRODUCTION, AND METHOD AND APPARATUS FOR REPRODUCING DATA USING THE COMPOSITE FILE STRUCTURE

This application claims the benefit of U.S. Provisional Application No. 60/601,993, filed on Aug. 17, 2004, in the name of inventors Kang Soo SEO, Jae Yong Yoo, Byung Jin KIM, and Seung Hoon LEE, entitled: "METHOD OF CONFIGURING MANAGEMENT FILE IN BLU-RAY DISC", which is hereby incorporated by reference as if fully set forth herein.

This application claims the benefit of Korean Patent Application No. 10-2004-0073794, filed on Sep. 15, 2004, which is hereby incorporated by reference as if fully set forth herein.

BACKGROUND OF THE INVENTION

1. Field of the Invention

The present invention relates to a method and apparatus for reproducing data, and more particularly to a method and apparatus for configuring a composite file structure, and reproducing data using the composite file structure, such that data recorded in a recording medium, and other data not present in the recording medium are simultaneously reproduced.

2. Discussion of the Related Art

Generally, there has been widely used an optical disc acting as a recording medium capable of recording a large amount of data therein. Particularly, there has recently been developed a high-density optical recording medium capable of recording/storing high-quality video data and high-quality audio data for a long period of time, for example, a Blu-ray Disc (BD).

The BD based on the next-generation recording medium technique has been considered to be the next-generation optical recording solution capable of storing much more data than a conventional DVD. In recent times, the international standard technical specification associated with the BD has been established.

In association with the above-mentioned situation, there has recently been developed an optical recording/reproducing device based on the BD international standard, but the BD international standard has not yet been completed, such that many limitations and problems occur in developing the optical recording/reproducing device.

Particularly, the above-mentioned optical recording/reproducing device must consider not only a basic function for recording/reproducing data of the BD, but also an additional function for enabling the optical recording/reproducing device to interact with peripheral digital devices. In other words, the optical recording/reproducing device must receive an external input signal, must display the received signal, and must reproduce desired data using the external input signal and the BD.

However, a unified standard specification for achieving the above-mentioned additional function has not yet been established, such that many limitations and problems occur in developing a BD-based optical recording/reproducing device. Specifically, the limitations and problems become serious in a specific technical field for reproducing data using both an external input signal and a BD reproduction signal as a single reproduction unit.

SUMMARY OF THE INVENTION

Accordingly, the present invention is directed to a method for configuring a composite file structure for data reproduction, and a method and apparatus for reproducing data using the composite file structure that substantially obviate one or more problems due to limitations and disadvantages of the related art.

An object of the present invention is to provide a method and apparatus for reproducing, new data suitable for a high-density recording medium.

Another object of the present invention is to provide a method for configuring a composite file structure, which can reproduce not only data of a recording medium but also other data not present in the recording medium, and a method for systemizing the above-mentioned method as standardized information, and providing the systemized result.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for configuring a composite file structure for data reproduction, wherein the composite file structure manages main data recorded in a recording medium and sub-data stored in a local storage while being associated with the main data, the method includes the step of including a downloaded playlist for reproducing the main data and the sub-data in the composite file structure.

In another aspect of the present invention, a method for configuring a composite file structure for data reproduction, wherein the composite file structure manages main data recorded in a recording medium and sub-data stored in a local storage while being associated with the main data, includes independently including an original playlist for reproducing the main data and a downloaded playlist for reproducing the sub-data in the composite file structure.

In another aspect of the present invention, a method for configuring a composite file structure for data reproduction, wherein the composite file structure manages main data recorded in a recording medium and sub-data stored in a local storage while being associated with the main data, includes including a composite playlist formed by combining an original playlist and a downloaded playlist in the composite file structure, such that the main data and the sub-data are simultaneously reproduced.

In another aspect of the present invention, a method for configuring a composite file structure for data reproduction, wherein the composite file structure is formed using main data recorded in a recording medium, one or more original playlists for reproducing the main data, and a downloaded playlist stored in the a storage, includes allowing the composite file structure to include a downloaded playlist substituted for one of the original playlist.

In another aspect of the present invention, a method for reproducing data includes (a) recognizing identification (ID) information of a recording medium recording main data, and determining whether sub-data having the same ID as that of the recording medium is present in a local storage, (b) if the sub-data is present in the local storage, configuring a composite file structure for simultaneously reproducing the main data and the sub-data, and (c) reproducing the main data and the sub-data using the configured composite file structure.

In a further aspect of the present invention, an apparatus for reproducing data includes a pickup unit for reading main data from a recording medium; a local storage for storing sub-data associated with the main data; a decoder for decoding the main data and the sub-data; and a controller for configuring a composite file structure, and controlling a decoding process of the decoder using the configured composite file structure, such that the main data and the sub-data are simultaneously reproduced.

It is to be understood that both the foregoing general description and the following detailed description of the present invention are exemplary and explanatory and are intended to provide further explanation of the invention as claimed.

BRIEF DESCRIPTION OF THE DRAWINGS.

The accompanying drawings, which are included to provide a further understanding of the invention and are incorporated in and constitute a part of this application, illustrate embodiment(s) of the invention and together with the description serve to explain the principle of the invention. In the drawings:

FIGS. 14A to 14C show syntaxes of an index file and an object file according to the present invention; and FIGS. 15A to 15e show a playlist syntax according to the present invention.

DETAILED DESCRIPTION OF THE INVENTION

Figure 1:
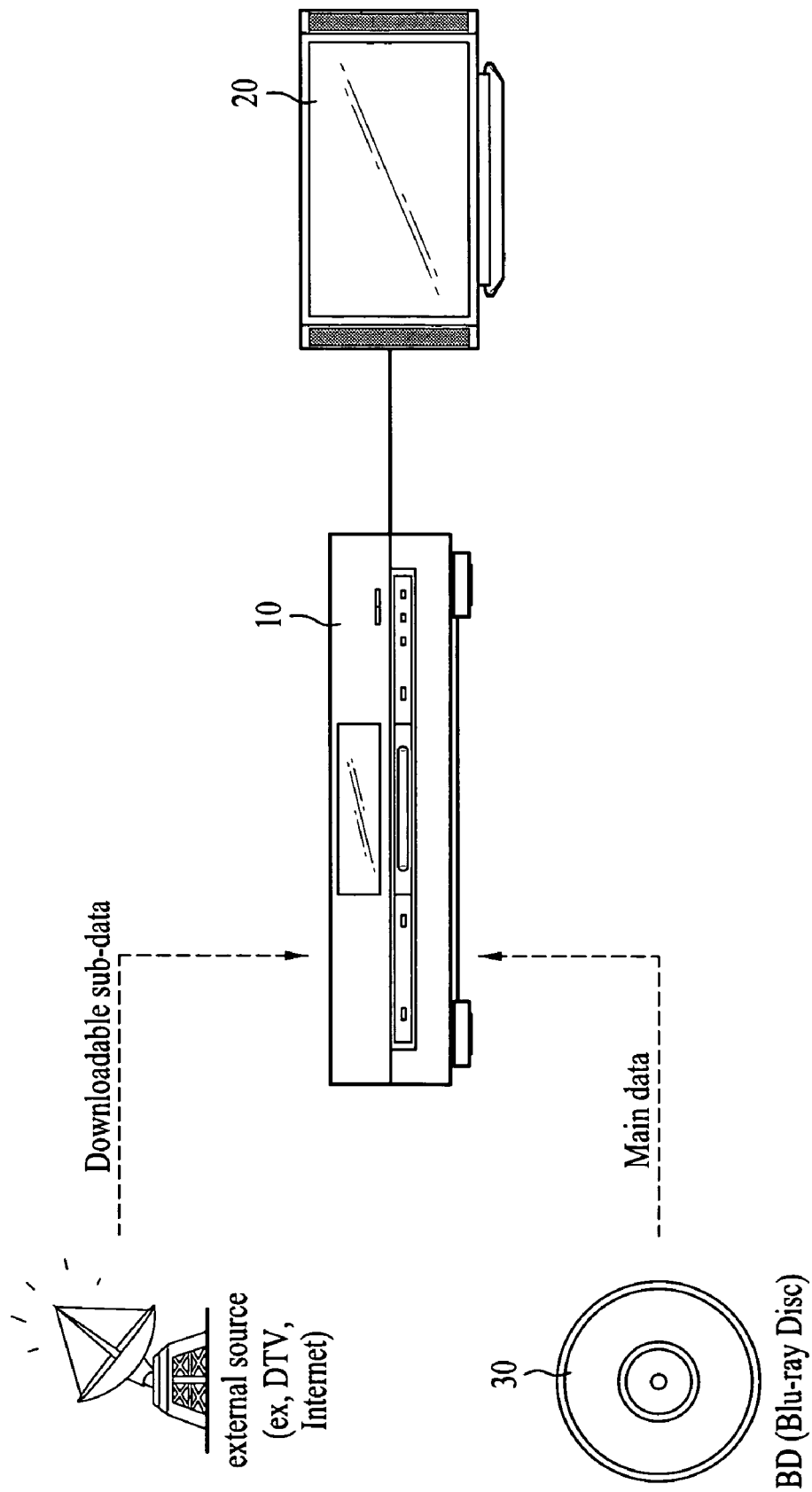
FIG. 1 is a conceptual diagram illustrating a method and apparatus according to the present invention.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc., according to various recording schemes. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "composite file structure" is indicative of a file structure for reproducing not only data recorded in a recording medium but also other data not present in the recording medium. The composite file structure is called a virtual package, and a file structure recorded in the recording medium is called a disc package.

The disc package recorded in the recording medium will hereinafter be described with reference to FIG. 2. When performing a reproduction or playback operation using auxiliary data stored in a local storage 15, the present invention changes the disc package or adds a specific file without changing the disc package, thereby creating a new composite file structure. The composite file structure will hereinafter be described with reference to FIGS. 6A to 13C.

The term "playlist" is one of a plurality of files contained in the above-mentioned file structure, and is indicative of a basic reproduction management file for reproducing an AV (Audio/Video) stream. A detailed description of the playlist will be described with reference to FIG. 2. The playlist is classified into an original playlist, a download playlist, and a composite playlist. The original playlist is recorded in a disc. The download playlist is downloaded from an external part, and is stored in a local storage, etc. The composite playlist is formed by combining the original playlist and the download playlist. It is obvious that the term "playlist" will be modified as a different term in another disc instead of the BD, and this modification may also be included in the scope of the present invention.

The term "title" is indicative of a reproduction unit composed of AV streams. The title can be recognized by a user, and is reproduced by reproducing the AV streams using the playlist upon receiving a title reproduction command from the user. One or more playlists are required to reproduce a single title, and a detailed description thereof will be given with reference to FIG. 3A. Specifically, for the convenience of description, the title recorded in the disc is called a main title, a title stored in a local storage is called an auxiliary (Aux) title, and a title formed by combining the main title and the auxiliary title is called a composite title.

Therefore, the main data is indicative of data including at least one main title recorded in a disc, and the auxiliary data is indicative of data including the auxiliary title stored in the local storage.

FIG. 1 is a conceptual diagram illustrating a method and apparatus according to the present invention. Unified usages of the optical recording/reproducing 10 and peripheral devices are shown in FIG. 1.

The optical recording/reproducing device 10 can record/reproduce data in/from various optical discs having different formats. If necessary, the optical recording/reproducing device 10 can record/reproduce specific data in/from only a specific optical disc such as, a BD, or can reproduce the data from the optical disc without recording the data in the same. It should be noted that the present invention uses a BD-player capable of reproducing data from the BD or a BD-recorder capable of recording data in the BD in consideration of both BD standard completion and correlation with peripheral devices as a preferred embodiment for the convenience of description. It is well known in the art that the optical recording/reproduction device 10 is also applicable to a driver embedded in a specific device such as a computer.

The optical recording/reproducing device 10 records or reproduces data in/from the optical disc 30, receives an external input signal, performs a signal process on the received signal, and transmits the signal processed result to the external display 20, such that a user can view the signal processed result on the display 20. In this case, there is no limitation in a receivable external signal. For example, representative external input signals may be determined to be a DTV-associated signal and an Internet-associated signal, etc. Specifically, the Internet is indicative of a communication network to which a user easily gains access, such that the user can download specific Internet data using the optical recording/reproducing device 10, and can use the downloaded data.

When the main data is recorded in the optical disc 30 loaded in the optical recording/reproducing device 10, and sub-data associated with the main data is present in other storage places (e.g., Internet) other than the optical disc, the present invention aims to reproduce the main data and the sub-data.

When the main data is recorded in the optical disc 30, and management information for reproducing the main data stored in other storage places other than the optical disc such as the Internet, the present invention aims to reproduce the main data using the downloaded playlist.

In more detail, if specific main titles are recorded in the main data recorded in the optical disc, and an auxiliary title associated with the main title is used as other sub-data for use in the Internet, some users may download the auxiliary title from the Internet, may desire to reproduce the downloaded auxiliary title along with the main title, or may desire to reproduce only the auxiliary title. In order to implement the above-mentioned desires of the users, correlation between the main data and the sub-data must be established, and there is needed a systemized method for reproducing the above-mentioned data according to a user request.

For the convenience of description, although a signal recorded in the disc is called the main data, and other signals existing in the outside of the disc are called the sub-data, it should be noted that the main data and the sub-data are not limited to only specific data. Generally, sub-data may be indicative of audio data, presentation graphic (PG) data, or interactive graphic data, etc., but the sub-data may also be indicative of a stream including the above-mentioned data and video data. In other words, data associated with the main data simultaneously existing in the outside of the optical disc may act as sub-data.

In order to implement the above-mentioned user requests, a predetermined file structure must be established between the main data and the sub-data. Accordingly, a file structure and data record structure for use in the BD will hereinafter be described with reference to FIGS. 2 to 3B.

Figure 2:
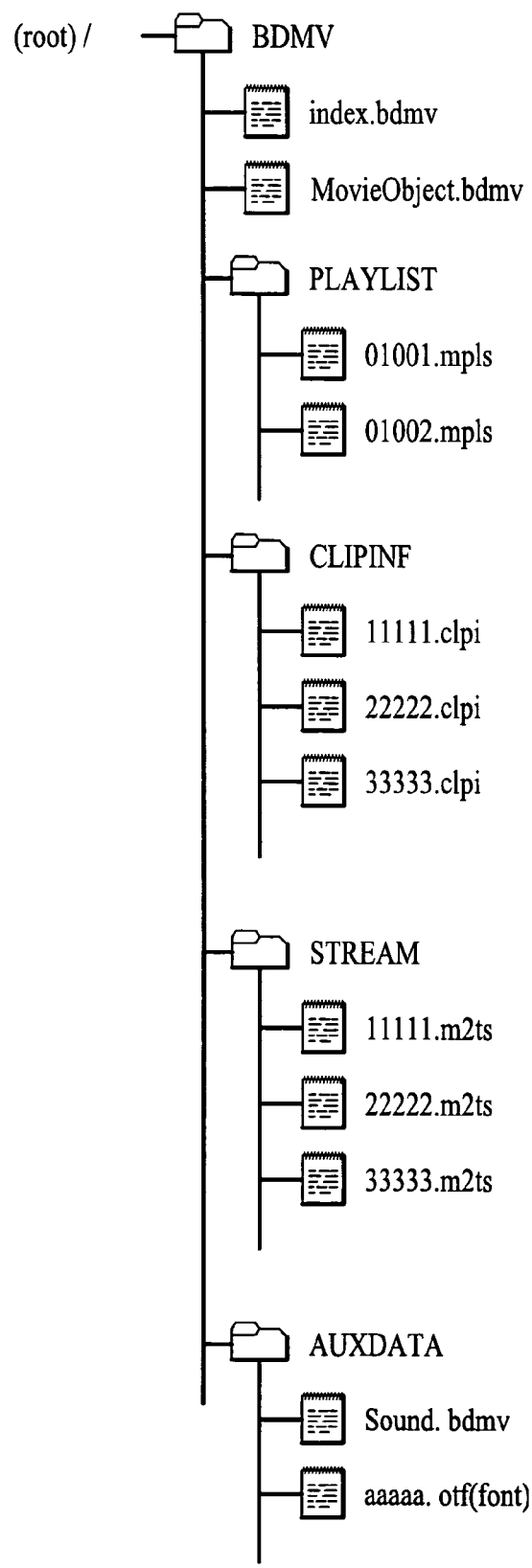
FIG. 2 is a conceptual diagram illustrating a file structure recorded in an optical disc acting as a recording medium.

FIG. 2 is a conceptual diagram illustrating a file structure recorded in an optical disc acting as a recording medium. An example of the above-mentioned file structure is shown in FIG. 2. The file structure according to the present invention includes one or more BD directories (BDMV) in a single root directory. The BD directory includes an index file "index.bdmv" and an object file "MovieObject.bdmv" acting as a general file capable of ensuring user interactivity. The file structure includes a variety of directories for storing information of actual data recorded in a disc and other information associated with a method for reproducing the data, for example, a playlist directory (PLAYLIST), a clip information directory (CLIPINF), a stream directory (STREAM), and an auxiliary directory (AUXDATA). The above-mentioned directories and a variety of files included in the directory will hereinafter be described.

The AUXDATA directory includes an additional data file for reproducing data of the disc. For example, the AUXDATA directory includes a "Sound.bdmv" file for providing a user with sound data when an interactive graphic function is executed, and an "aaaaa.otf" file for providing the user with font information when data of the disc is reproduced. For the convenience of description, the AUXDATA directory will herein be omitted in figures since FIG. 6A.

The stream directory (STREAM) includes a plurality of AV (Audio and Video) stream files recorded in a disc according to a specific format, and also includes a file associated with interactive graphic streams. Generally, individual streams are recorded using an MPEG-2 based transport packet. Therefore, the stream directory (STREAM) uses extension names of stream files (1111.m2ts, 2222.m2ts, and 33333.m2ts) as a specific extension name "*.m2ts". The above-mentioned stream may also be called a clip file in the BD standard. Particularly, if video/audio/graphic information from among the above-mentioned streams are multiplexed, the multiplexed information is called an AV stream, and a single title is configured as at least one AV stream file.

The clip information (Clip-info) directory (CLIPINF) is composed of a plurality of clip-info files (11111.clpi, 22222.clpi, and 33333.clpi) connected to the above-mentioned stream files on a one-to-one basis. Particularly, the clip-info files (*.clpi) record attribute information and timing information of the stream files (i.e., clip-files) therein. The clip-info files (*.clpi) connected to the stream files (*.m2ts) on a one-to-one basis are generically named a "Clip". In other words, this means that a single stream file (*.m2ts) must correspond to a clip-info file (*.clpi).

A clip associated with the main data recorded in the disc is called a main clip. A clip associated with downloaded sub-data stored in a local storage is called a sub-clip.

The playlist directory (PLAYLIST) includes a plurality of playlist files (*.mpls). Each playlist file (*.mpls) includes one or more playitems (PlayItem) for designating a playing interval during which a specific clip is reproduced. The playitem (PlayItem) includes information associated with a specific clip to be reproduced, i.e., information associated with a reproduction start time (IN-Time) and other information associated with a reproduction termination time (OUT-Time) of a clip determined to be a clip name (Clip_Information_File_name) contained in the playitem (PlayItem).

The playlist file (*.mpls) is used as a basic reproduction management file unit contained in an overall file structure, such that it can reproduce a desired clip using a combination of one or more playitems. The playlist file (*.mpls) may include data different from reproduction data formed by the playitem. The playlist file (*.mpls) may include a sub-playitem (SubPlayItem) distinguished from the playitem (PlayItem).

Figure 3A:
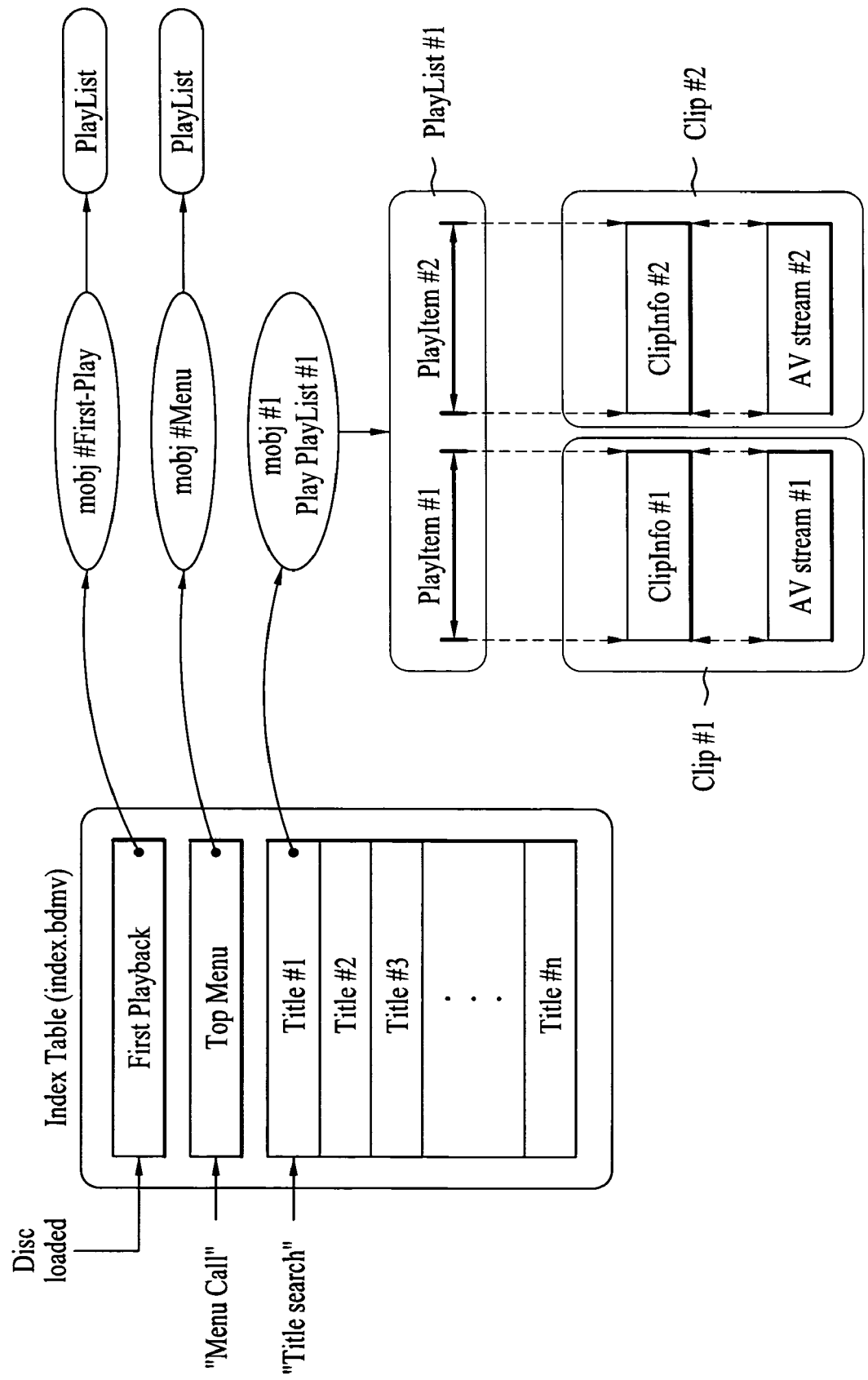
FIG. 3A is a relationship among files used for reproducing a specific title according to the present invention.

FIG. 3A is a relationship among files used for reproducing a specific title according to the present invention. Upon receiving a title reproduction command from a user in association with a specific title applied to an index table of an index file, a method for reproducing the specific title will hereinafter be described.

The index file (index.bdmv) includes first playback information "First Playback" indicative of information associated with a first reproduction image when a corresponding disc is loaded, top menu information "Top_Menu" for providing a menu image, and at least one title information "Title #1 ~Title #n".

If the user selects a specific menu from among a plurality of menus of a specific title or a menu image, a specific playlist is reproduced according to a command contained in individual objects "mobj," contained in an object file (MovieObject.bdmv) of a file structure, and a specific clip (denoted by "ClipInfo+AV stream") is reproduced by a playitem contained in the playlist.

For example, if a disc is loaded in the optical recording/reproducing device 10, and a user desires to reproduce the title #1, the title #1 is mapped to an object "mobj#1" having a specific command contained in the file structure pre-recorded in the disc, the command contained in the "mobj#1" object includes a command for reproducing the playlist #1. Therefore, the optical recording/reproducing device 10 reproduces corresponding clips #1 and #2 according to playitems #1 and #2 contained in the playlist #1, such that it reproduces the title #1 desired by the user, and provides the user with the reproduced title #1.

Figure 3B:
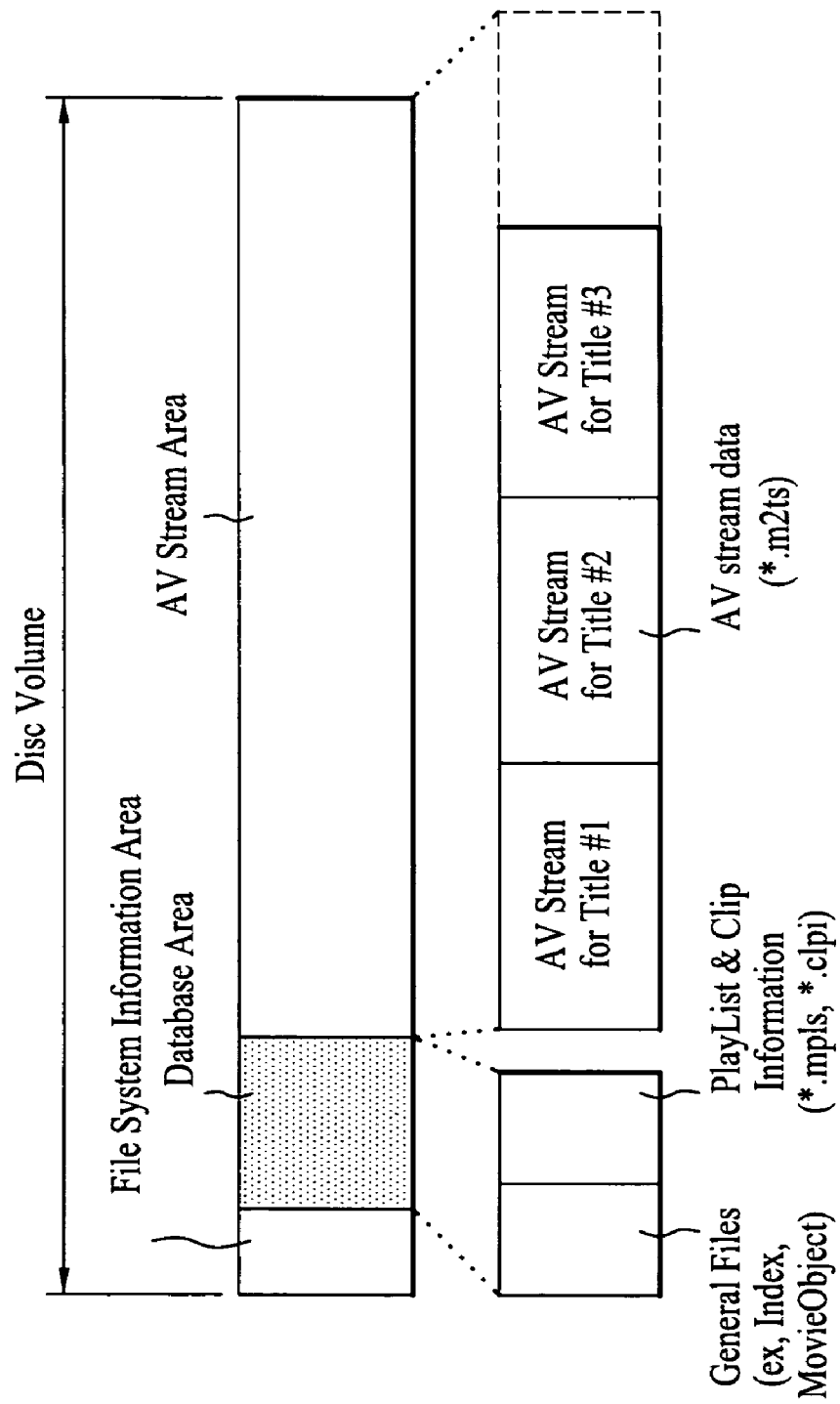
FIG. 3B is a structural diagram illustrating a data record structure recorded in a recording medium according to the present invention.

FIG. 3b is a structural diagram illustrating a data record structure recorded in a recording medium according to the present invention. As shown in FIG. 3B, from the viewpoint of an inner area of the disc, the above-mentioned disc structure, sequentially includes a file system information area serving as system information for managing overall files, a database area for recording a playlist file and a clip-info file to reproduce a recorded AV stream (*.m2ts), and an AV stream area for recording a plurality of streams composed of audio data, video data, and graphic data, etc. Particularly, it should be noted that data recorded in the AV stream area may be determined to be main data, and the main data is composed of one or more main titles as previously stated above.

The present invention relates to a method for reproducing the main data recorded in the optical disc and the sub-data stored in a local storage, or a method for reproducing the main data using reproduction management information stored in the local storage, and preferred embodiments of the present invention will hereinafter be described.

Figure 4:
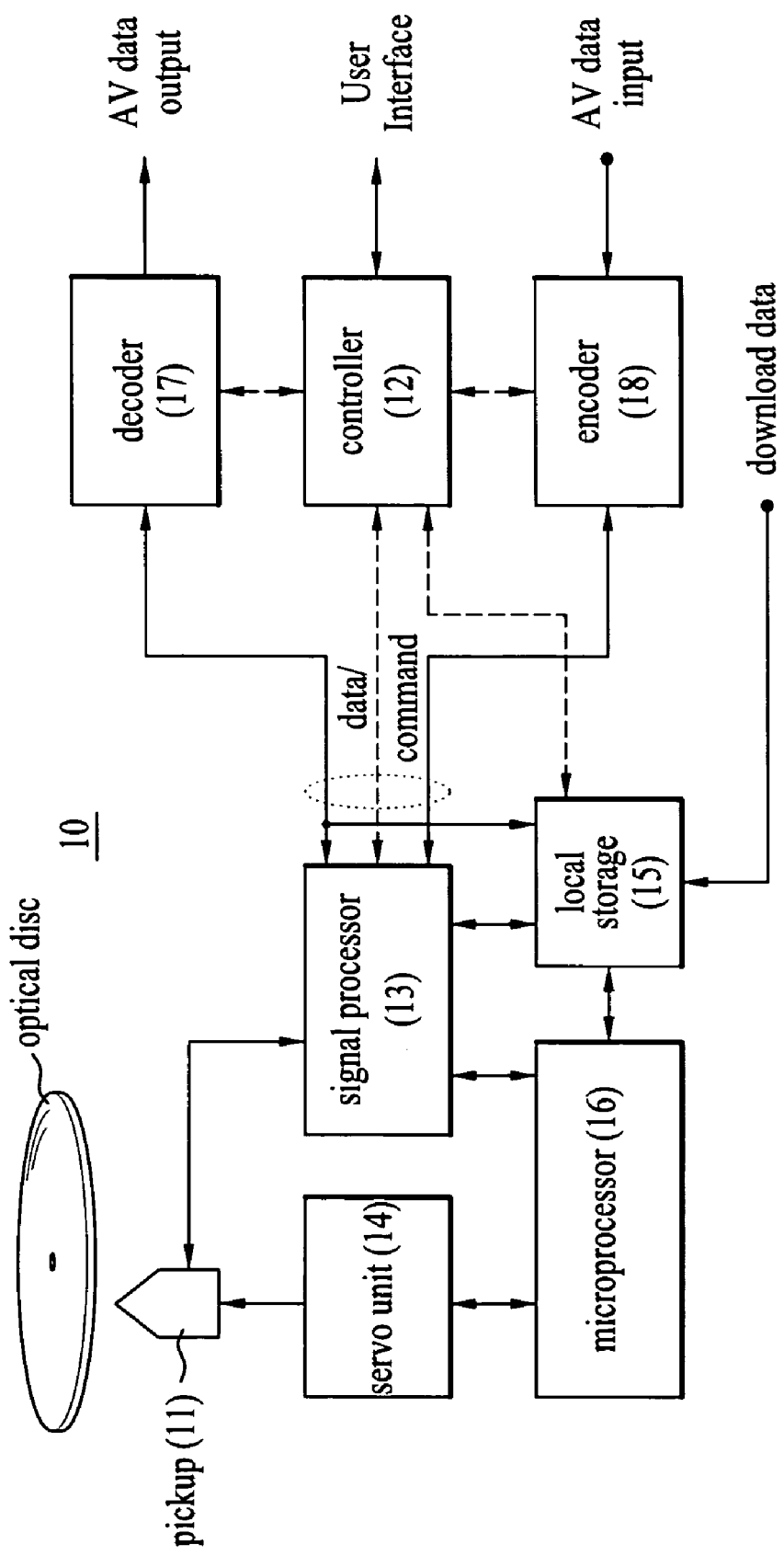
FIG. 4 is a block diagram illustrating an optical recording/reproducing device according to the present invention.

FIG. 4 is a block diagram illustrating the optical recording/reproducing device 10 according to the present invention.

Referring to FIG. 4, the optical recording/reproducing device 10 includes a pickup unit 11, a servo unit 14, a signal processor 13, a local storage 15, and a microprocessor 16. The pickup unit 11 reproduces main data recorded in the optical disc and management information including reproduction management file information. The servo unit 14 controls operations of the pickup unit 11. The signal processor 13 receives a reproduction signal from the pickup unit 11, restores the received reproduction signal to a desired signal value, or modulates a signal to be recorded into another signal recorded in the optical disc, such that it transmits the restored or modulated result. The local storage 15 stores data or information downloaded from an external part. The microprocessor 16 controls mutual operations of the above-mentioned components.

A controller 12 downloads sub-data existing in the outside of the optical disc upon receiving a command from a user, stores the downloaded sub-data in the local storage 15, and configures a new composite file structure to reproduce the main data recorded in the optical disc and the sub-data stored in the local storage. The controller 12 reproduces the main data and/or the sub-data using the configured composite file structure.

A decoder 17 finally decodes output data (i.e., main data and/or sub-data) upon receiving a control signal from the controller 12, and provides the user with the decoded result.

An encoder 18 converts an input signal into a specific format signal (e.g., an MPEG2 transport stream) upon receiving a control signal from the controller 12, and transmits the converted result to the signal processor 13.

The new composite file structure may be stored in the local storage 15 such that it can be re-used in future. Also, the new composite file structure may be temporarily stored in an additional dynamic memory, and may then be used.

If a user stores the sub-data and the composite file structure in the local storage 15, and desires to continuously use the sub-data and the composite file structure in future, it is preferable that the sub-data and the composite file structure are used earlier than the file structure recorded in a disc managing only the main data. A detailed description of the method for configuring the composite file structure will hereinafter be given with reference to FIG. 6A.

Figure 5A:
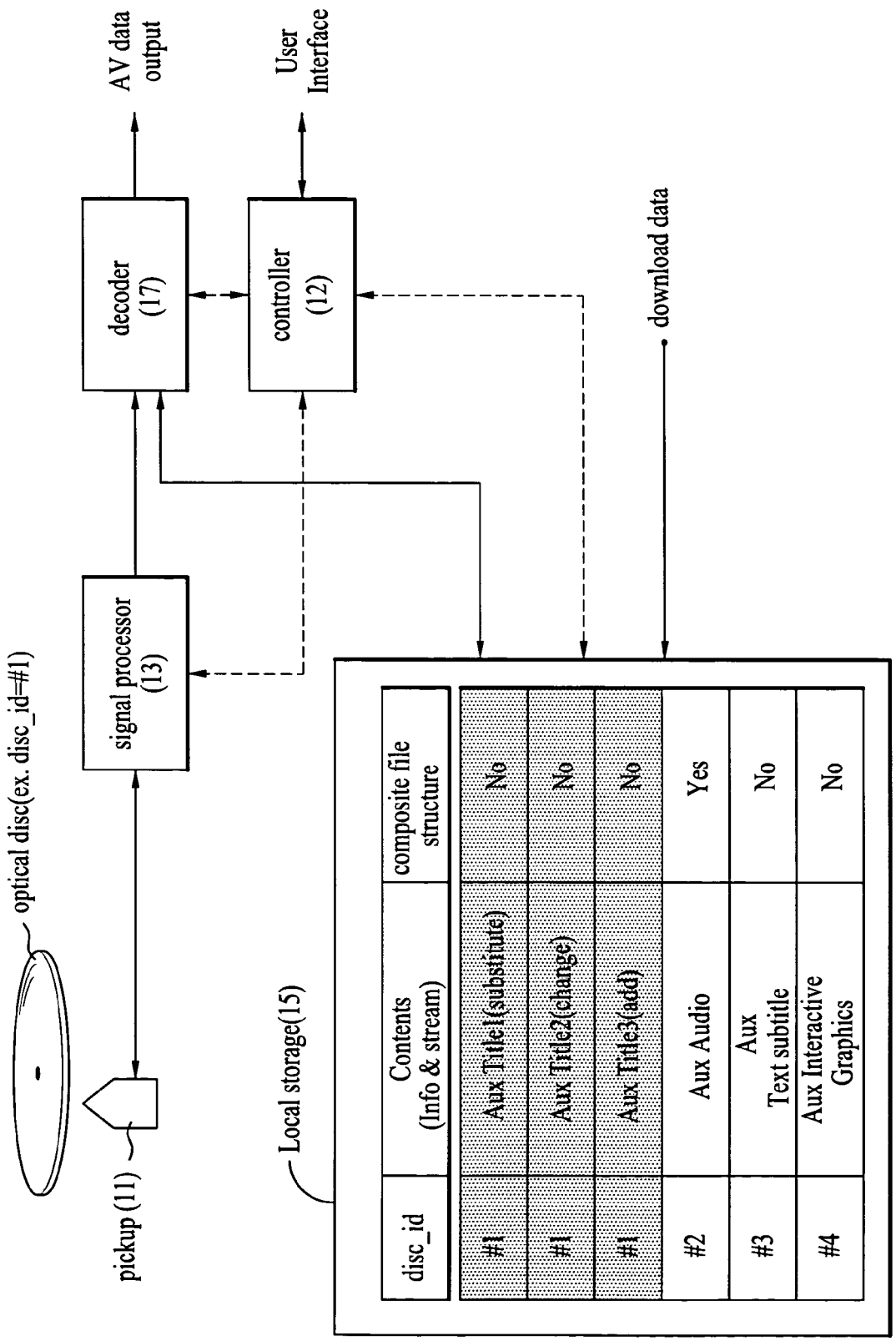
FIG. 5A is a block diagram illustrating an apparatus for reproducing data according to the present invention.
Figure 5B:
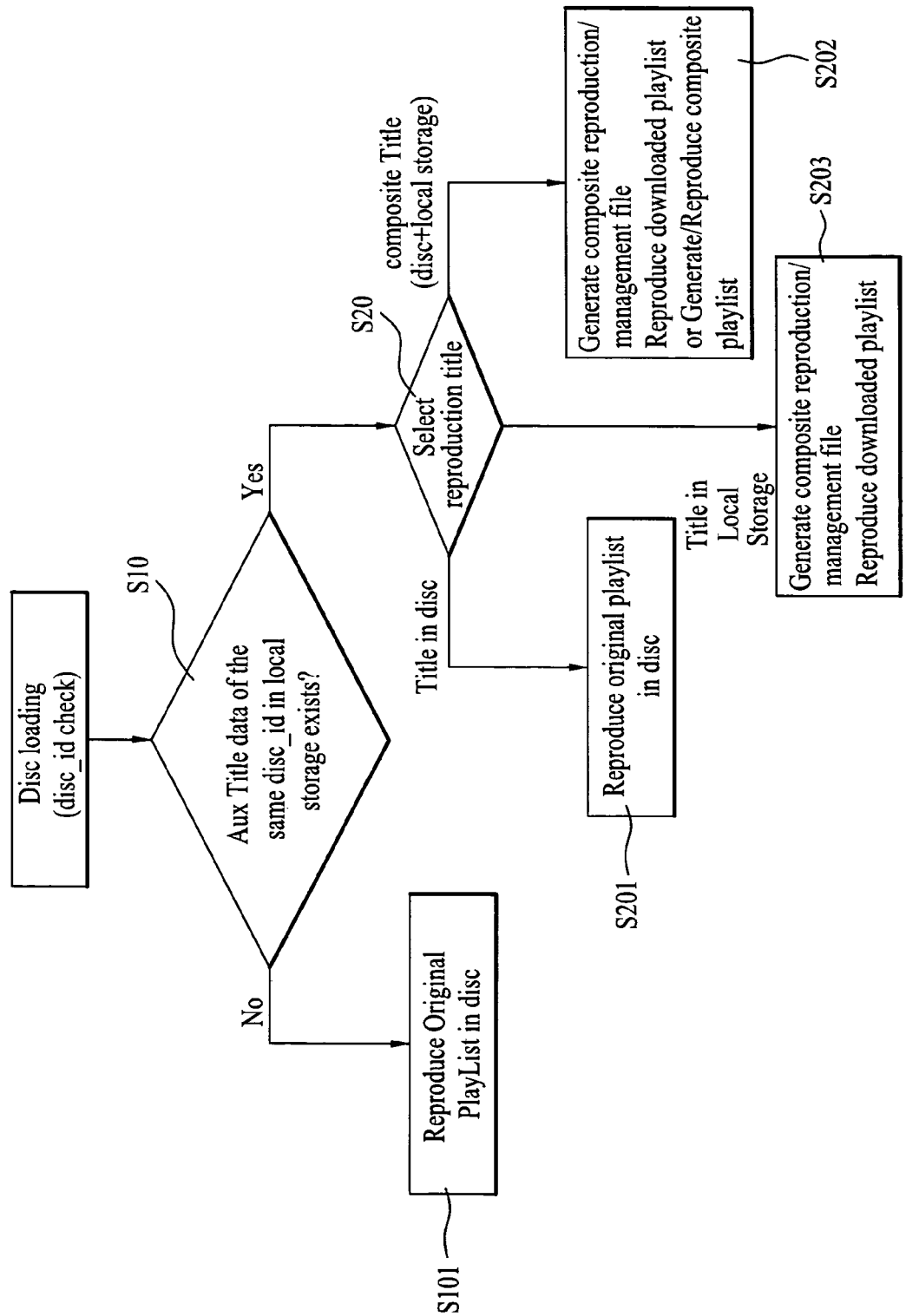
FIG. 5B is a flow chart illustrating a method for reproducing data according to the present invention.

FIG. 5a is a block diagram illustrating an apparatus 10 for reproducing data of an optical disc according to the present invention. FIG. 5B is a flow chart illustrating a method for reproducing data of the optical disc according to the present invention.

For example, if an optical disc (disc_id=#1) having a disc identification (ID) (disc_id) of #1, the controller 12 of the optical recording/reproducing device 10 recognizes ID information of a corresponding disc using the pickup unit 11 and the signal processor 13, and determines whether an auxiliary title (Aux-title) associated with "disc_id=#1" information is present in the sub-data stored in the local storage 15 at step S10.

For example, if first to third auxiliary titles (Aux Title 1, Aux Title 2, and Aux Title 3) are associated with the information "disc_id=#1" stored in the local storage 15, the controller 12 selects a reproduction title upon receipt of a user request or a, system setup command at step S20.

In other words, the controller 12 directs the presence of the auxiliary title to the user, reproduces: only the main title contained in a disc according to either the user command or the system setup command, reproduces only the auxiliary title stored in the local storage 15, or reproduces a composite title formed by combining the main title and the auxiliary title.

If the user desires to reproduce only the main title, the main title is reproduced according to a file structure recorded in the disc. Particularly, the main title is reproduced using an original playlist.

If the user desires to reproduce only the auxiliary title, a downloaded playlist for reproducing the auxiliary title is combined with a reproduction management file recorded in the disc, such that a composite file structure is formed. The downloaded playlist contained in the composite file structure is then used.

If the user desires to reproduce a composite title formed by combining the main title and the auxiliary title, a composite file structure including the downloaded playlist for reproducing the auxiliary title and the original playlist for reproducing the main title is formed, and the downloaded playlist contained in the composite file structure is used. Otherwise, a composite playlist is configured as necessary, such that the composite title can be reproduced using the composite playlist.

The new composite file structure is stored in the local storage 15, and may then be employed to reproduce sub-data. For example, FIG. 5A shows a specific case in which a composite file structure for reproducing an auxiliary audio stream acting as sub-data of the "disc_id=#2" information is pre-stored in the local storage 15. Therefore, if the disc of "disc_id=#2" is loaded in the optical recording/reproducing device 10, the composite file structure pre-stored in the local storage 15 is used, such that a reproduction operation can be performed without configuring a new composite file structure.

In association with the information "disc_id=#2" stored in the local storage 15, FIG. 5A shows a predetermined case in which sub-data and a composite file structure are stored in the local storage 15. In association with the remaining information "disc_id=#1,#3,#4", FIG. 5A shows a predetermined case in which only the sub-data is stored but the composite file structure is not stored.

A method for configuring a composite file structure, and a variety of preferred embodiments associated with a reproduction method using the composite file structure will hereinafter be described with reference to FIGS. 6A to 13C. The following characteristics will be commonly applied to the preferred embodiments for configuring a composite file structure.

Firstly, in order to configure the composite file structure, the local storage 15 must store not only the sub-data but also reproduction management information (e.g., a downloaded playlist, a clip-info, and information for configuring the composite file structure). Preferably, the above-mentioned reproduction management information must be prepared by a disc author, and must then be downloaded along with the sub-data at the same time. In FIG. 5A, the term "Info" contained in the term "Info & stream" acting as contents stored in the local storage 15 is indicative of the reproduction management information. Specifically, some preferred embodiments may store only the reproduction management data other than the sub-data.

Secondly, an AV stream in which video data, audio data, and graphic data are multiplexed is suitable for the sub-data of the present invention. The AV stream configures a specific auxiliary title. The auxiliary title fully substitutes for the main title recorded in the optical disc, or partially substitutes for the main title. The auxiliary title extends or reduces a content of the main title. Otherwise, a new independent title is added to the main title.

Thirdly, a composite file structure for simultaneously reproducing the main data and the sub-data is configured. In this case, the original playlist recorded in the disc and the downloaded playlist stored in the local storage are combined in the composite file structure. In more detail, the original playlist and the downloaded playlist may be configured independently of each other, or the composite playlist may be formed by combining the original playlist and the downloaded playlist. A detailed description thereof will hereinafter be given.

Fourthly, although the playlist always includes at least one playitem contained in a main path, a sub-playitem (SubPlayItem) contained in a sub path may also be configured as necessary. For the convenience of description, the present invention exemplarily shows preferred embodiments, each of which uses the playitem contained in the main path as an example.

FIGS. 6A to 7C show a variety of examples constructing a preferred embodiment associated with a method for configuring a composite file structure according to the present invention. In the preferred embodiment shown in FIGS. 6A to 7C, the main data and the sub-data are configured independently of each other. Therefore, the original playlist for reproducing the main data and the downloaded playlist for reproducing the sub-data are contained in the composite file structure independently of each other.

FIGS. 6A to 6D show a variety of examples in which the downloaded playlist substitutes for a corresponding original playlist. For example, the examples shown in FIGS. 6A to 6D are made available when all parts of a specific main title are replaced with others using an auxiliary title. A detailed description thereof will hereinafter be given.

FIG. 6A shows the original playlist (01001.mpls) recorded in the disc 30 and the downloaded playlist (01001_1.mpls) stored in the local storage 15 while being associated with the original playlist (01001.mpls). Each playlist uses three playitems (PlayItem #1, PlayItem #2, and PlayItem #3) as a main path. Each playitem is involved in reproduction of a specific AV stream.

Figure 6B:
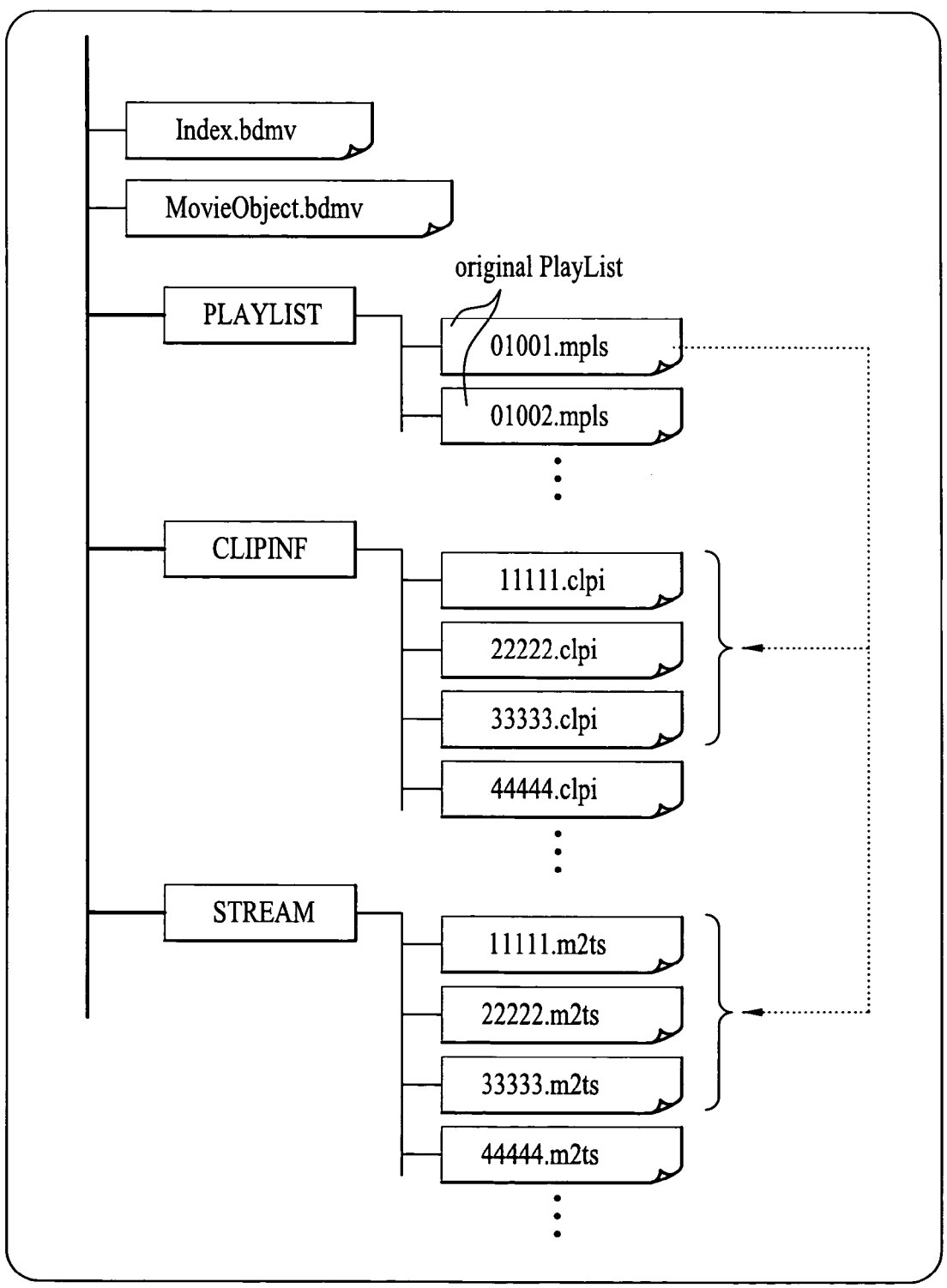
FIGS. 6A to 7C show a variety of examples constructing a preferred embodiment associated with a method for configuring a composite file structure according to the present invention.

The original playlist (01001.mpls) performs reproduction operations of AV streams (AV stream #1, AV stream #2, and AV stream #3) recorded in the disc using the playitems (PlayItem #1, PlayItem #2, and PlayItem #3), respectively. FIG. 6B shows a reproduction management file structure including the above-mentioned playlist (01001.mpls) A detailed description of a variety of functions of individual files contained in the file structure will hereinafter be given with reference to FIG. 2.

As can be seen from FIG. 6B, an index file (index-bdmv) and an object file (MovieObject.bdmv) are contained as an upper file in the file structure recorded in the disc. A plurality of playlist files (e.g., 01001.mpls, 01002.mpls, ...) including the original playlist (01001.mpls) are contained in the playlist directory (PLAYLIST). A plurality of clip-info files (*.clpi) are contained in the clip-info directory (CLIPINF), and a plurality of stream files (*.m2ts) are contained in the stream directory (STREAM).

Specifically, stream files (11111.m2ts, 22222.m2ts, and 33333.m2ts) are indicative of AV streams (AV stream #1, AV stream #2, and AV stream #3) reproduced by playitems (PlayItem #1, PlayItem #2, and PlayItem #3) contained in the original playlist (01001.mpls). Clip-info files (11111.clpi, 22222.clpi, and 33333.clpi) are employed to reproduce stream files (11111.m2ts, 22222.m2ts, and 33333.m2ts), respectively.

Figure 6C:
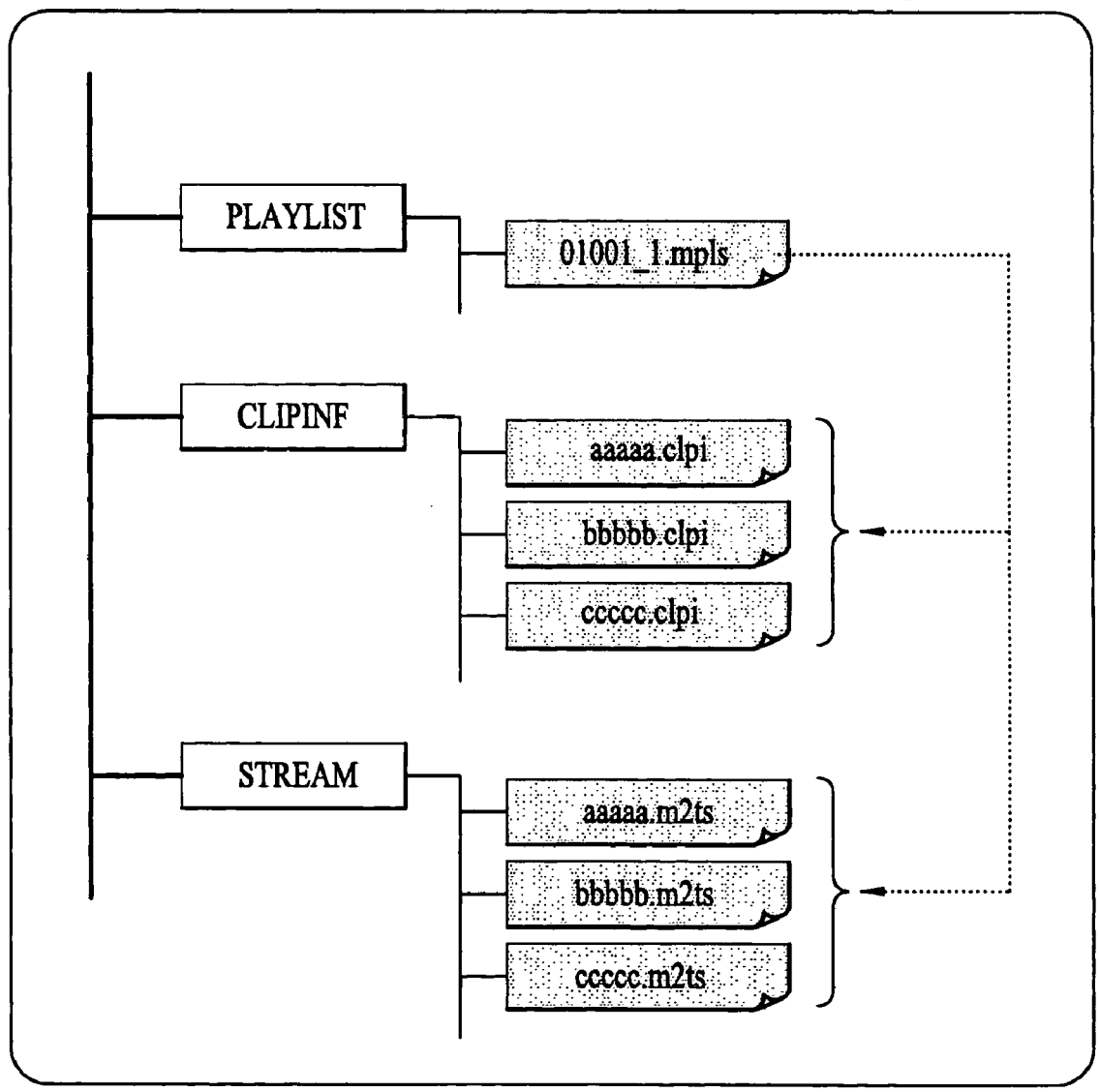

The downloaded playlist (01001_1.mpls) performs reproduction operations of the AV streams (AV stream #a, AV stream #b, and AV stream #c stored in the local storage 15 using the playitems (PlayItem #1, PlayItem #2, and PlayItem #3), respectively. FIG. 6C shows a file structure stored in the local storage 15 including the downloaded playlist (01001_1.mpls)

As can be seen from FIG. 6C, reproduction management information stored in the local storage 15 includes the downloaded playlist (01001_1.mpls) in the playlist directory (PLAYLIST), includes clip-info files (*.clpi) in the stream directory (STREAM), and includes a stream file (*.m2ts) in the stream directory (STREAM).

Specifically, stream files (aaaaa.m2ts, bbbbb.m2ts, and ccccc.m2ts) are indicative of AV streams #a, #b, and #c contained in the downloaded playlist (01001_1.mpls) shown in FIG. 6A, respectively. The clip-info files (aaaaa.clpi, bbbbb.clpi, and ccccc.clpi) are indicative of files for reproducing stream files (aaaaa.m2ts, bbbbb.m2ts, and ccccc.m2ts).

Figure 6D:
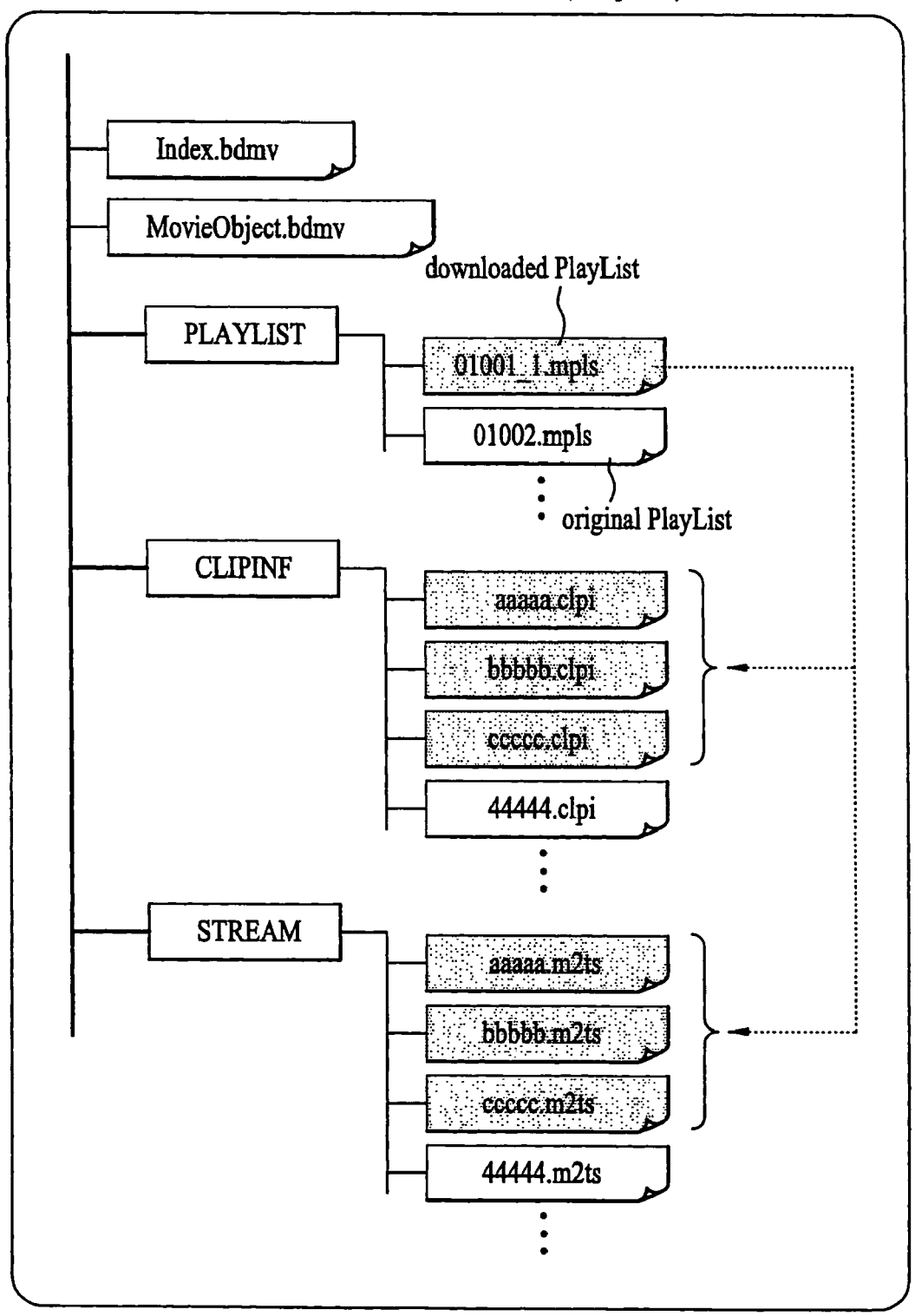

FIG. 6D shows a composite file structure. The composite file structure is reproduced along with the main data using sub-data (AV streams #a, #b, and #c) and the downloaded playlist (01001_1.mpls) stored in the local storage 15.

In other words, the the original playlist (01001_1.mpls), the clip-info files (11111.clpi, 22222.clpi,and 33333.clpi), and the stream files (11111.m2ts, 22222.m2ts, and 33333.m2ts) shown in FIG.6C and replaced with the downloaded playlist (01001_1.mpls), the clip-info files (aaaaa.clpi, bbbbb.clpi, and ccccc.clpi), and the stream files (aaaaa.m2ts, bbbbb.m2ts, and ccccc.m2ts) contained in the composite file structure, respectively.

Therefore, provided that the original playlist (01001.mpls) is a file for reproducing a single title (Title #1), AV streams (AV stream #a, AV stream #b, and AV stream #c) contained in the local storage 15 are reproduced, instead of AV streams (AV stream #1, AV stream #2, and AV stream #3) recorded in the disc on the condition that a corresponding title (Title #1) is reproduced using the index file (index.bdmv) of the composite file structure. In conclusion, it can be recognized that the main title (Title #1) contained in the disc is replaced with the auxiliary title downloaded in the local storage 15.

The remaining files other than the above-mentioned replaced files in the composite file structure, for example, the original playlist; (01002.mpls), the clip-info file (44444.clpi), and the stream file (44444.m2ts) are configured to have the same structure as those of original files recorded in the disc. The index file (index.bdmv) and the object file (MovieObject.bdmv) may be configured to have the same structure as that of the files recorded in the disc.

Figure 7A:
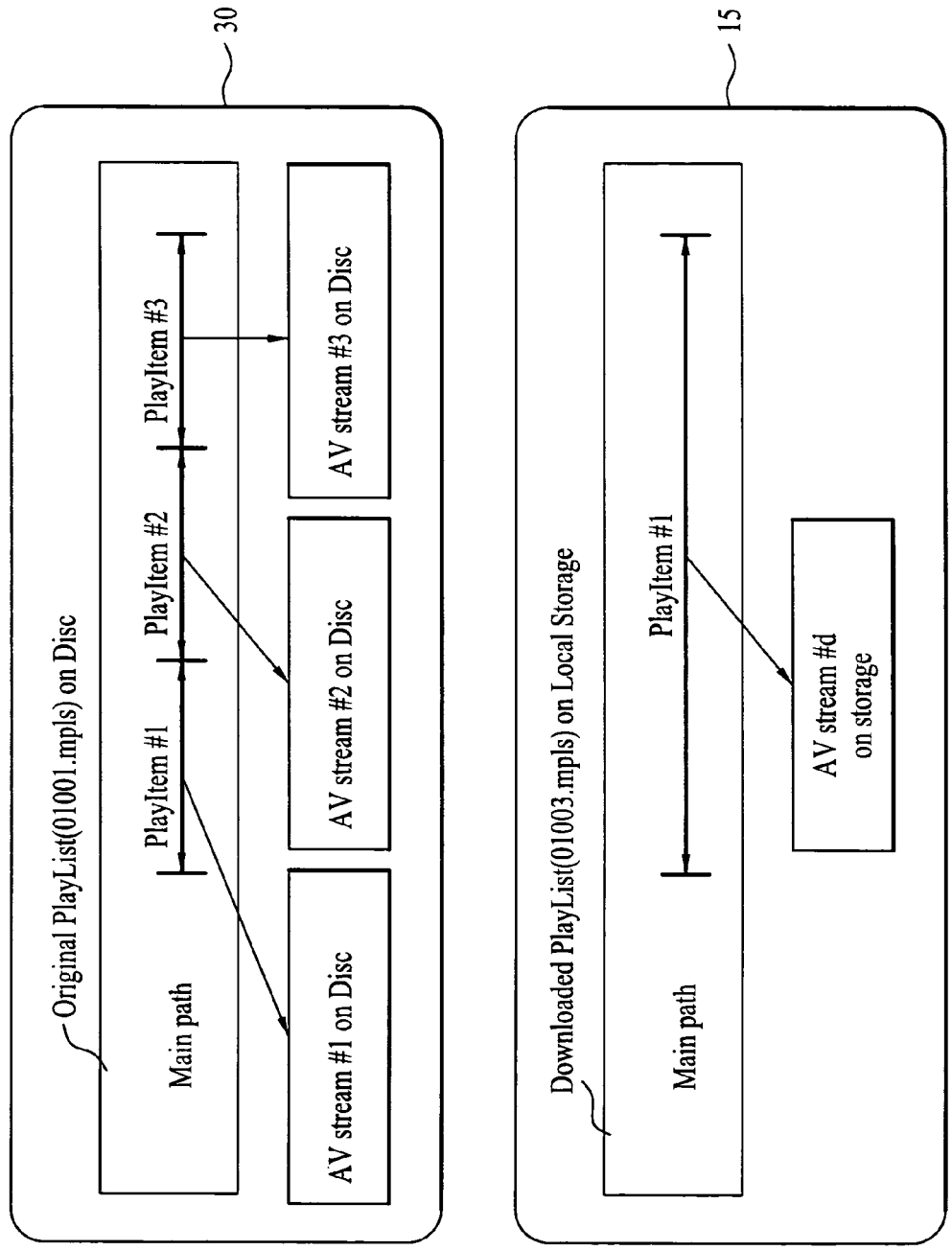
Figure 7B:
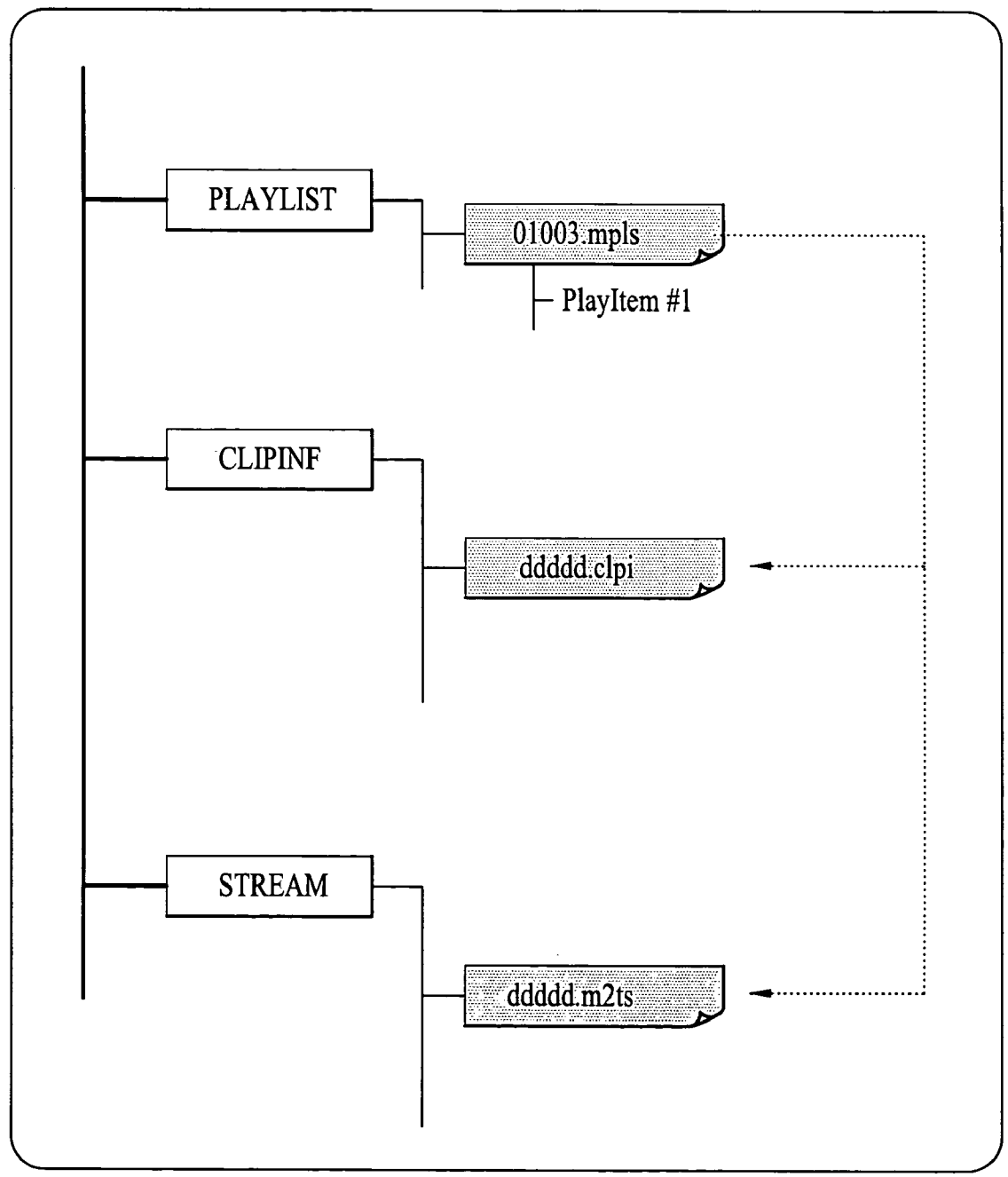
Figure 7C:
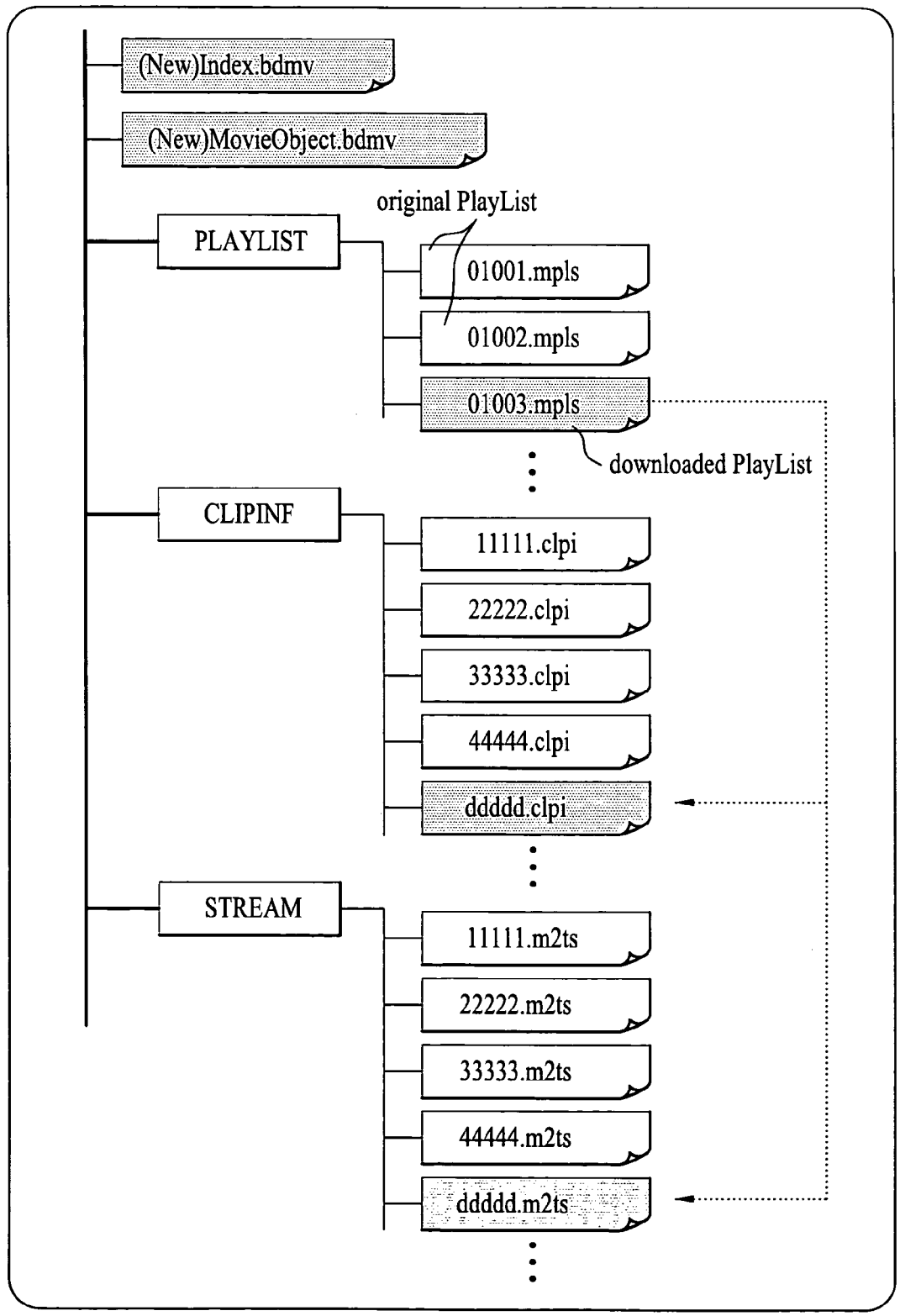

FIGS. 7A to 7C show an example in which new sub-data is added by, the downloaded playlist. For example; the example shown in FIGS. 7A to 7C is available when a new independent auxiliary title is added to the main title contained in the disc. A detailed description will hereinafter be given.

FIG. 7A shows the original playlist (01001.mpls) recorded in the disc 30 and the downloaded playlist (01003.mpls) stored in the local storage 15. The playlist (01001.mpls) includes a plurality of playitems, (PlayItem #1, PlayItem #2, and PlayItem #3) as a main path. The downloaded playlist (01003.mpls) includes a playitem (PlayItem #1) as a main path.

In other words, the original playlist (01001.mpls) reproduces and manages AV streams (AV stream #1, AV stream #2, and AV stream #3) recorded in the disc using the playitems (PlayItem #1, PlayItem #2, and PlayItem #3) FIG. 6B shows an overall reproduction management file structure including the above-mentioned original playlist (01001.mpls). The following disc file structure is the same as that of FIG. 6B, such that a detailed description thereof will herein be omitted for the convenience of description.

The downloaded playlist (01003.mpls) reproduces and manages the AV stream (AV stream #d) stored in the local storage 15 using the playitem (PlayItem #1). FIG. 7B shows a file structure contained in the local storage including the downloaded playlist (01003.mpls).

As can be seen from FIG. 7B, it can be recognized that the file structure of the local storage 15 includes the downloaded playlist (01003.mpls) contained in the playlist (PLAYLIST), a clip-info file (ddddd.clpi) contained in the clip-info directory (CLIPINF), and stream files (ddddd.m2ts) contained in the stream directory (STREAM).

Specifically, the stream file (ddddd.m2ts) is indicative of an AV stream (AV stream #1) reproduced by the playitem (PlayItem #1) contained in the downloaded playlist (01003.mpls) shown in FIG,. 7A. The clip-info file (ddddd.clpi) is indicative of a file capable of reproducing the stream file (ddddd.m2ts), and is contained in the file structure along with its associated stream file (ddddd.m2ts).

FIG. 7C shows a composite file structure, which is reproduced along with the main data using both the sub-data (i.e., AV stream #d) and the downloaded playlist (01003.mpls) stored in the local storage 15.

In more detail, according to the composite file structure shown in FIG. 7C, the downloaded playlist (01003.mpls) is added to the original playlists (01001.mpls, 01002.mpls), the clip-info file (ddddd.clpi) corresponding to the downloaded playlist (01003.mpls) is added to the clip-info files (11111.clpi, 22222.clpi, 33333.clpi, and 44444.clpi), and the stream file (ddddd.m2ts) is independently added to, the stream files (11111.m2ts, 22222.m2ts., 33333.m2ts, and 44444.m2ts).

Therefore, provided that the original playlists (01001.mpls and 01002.mpls) correspond to a file for reproducing a single title (e.g., Title #1) and a file for reproducing a single title. (e.g., Title #2), this means that a new title (e.g., Title #3) is added by not only the original playlist (01001.mpls, and 01002.mpls) but also the downloaded playlist (01003.mpls).

The index file (index.bdmv) and the object file (MovieObject.bdmv) are included in the composite file structure. If a new title (e.g., Title #3) is added by the downloaded playlist (01003.mpls), the above-mentioned index file (index.bdmv) and the object file (MovieObject.bdmv) must be replaced with a new index file (index.bdmv) and a new object file in consideration of the added title (e.g., Title #3).

In conclusion, the downloaded playlists shown in FIGS. 6A and 7A are characterized in that they independently reproduce sub-data (i.e., an auxiliary title) stored in the local storage 15.

FIGS. 8A to 10C show a variety of examples in which the composite file structure is formed by combining the main data and the sub-data. As can be seen from FIGS. 8A to 10C, the downloaded playlist for reproducing the main data and the sub-data is included in the composite file structure.

Figure 8A:
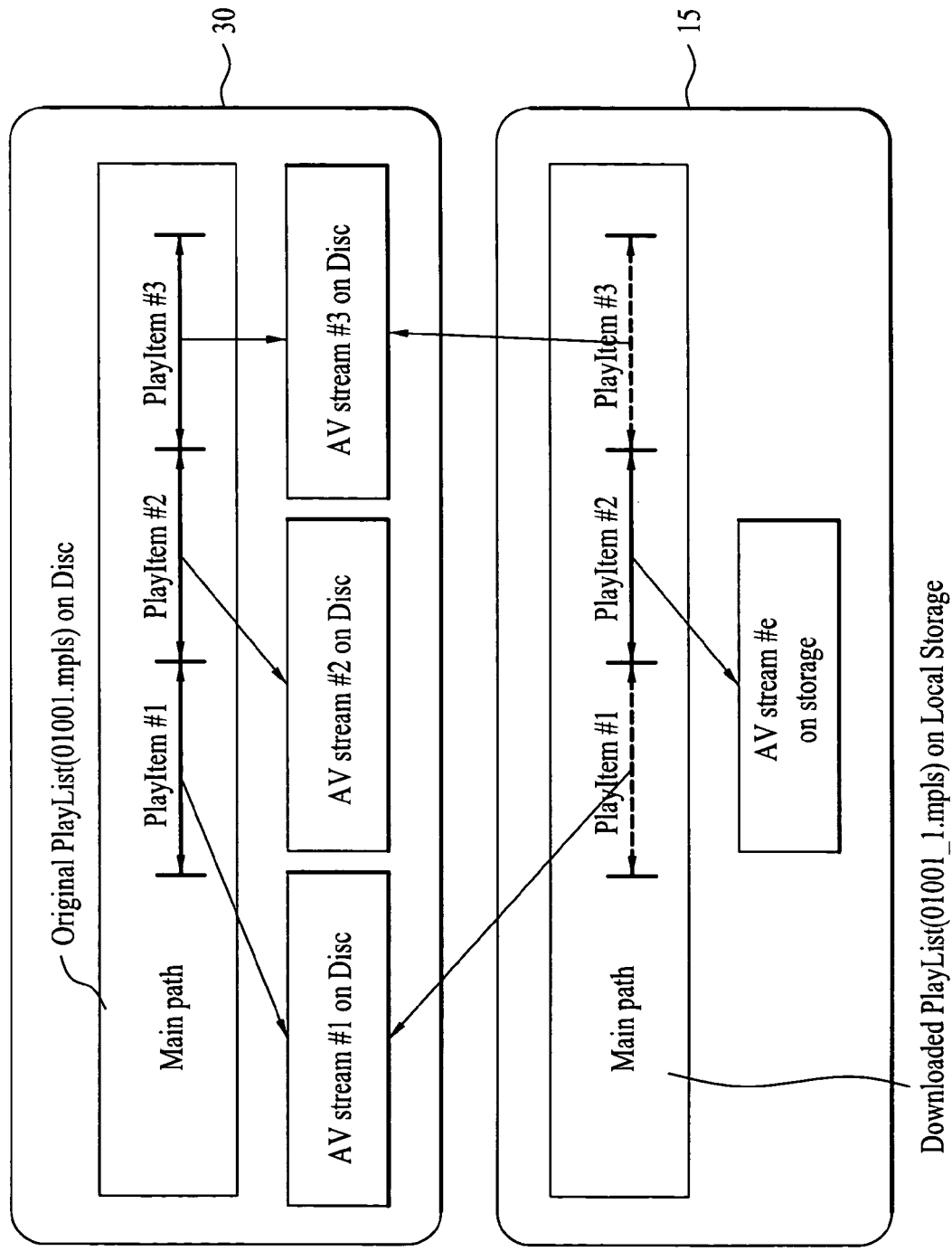
FIGS. 8A to 11C show a variety of examples constructing another preferred embodiment associated with a method for configuring a composite file structure according to the present invention.
Figure 9A:
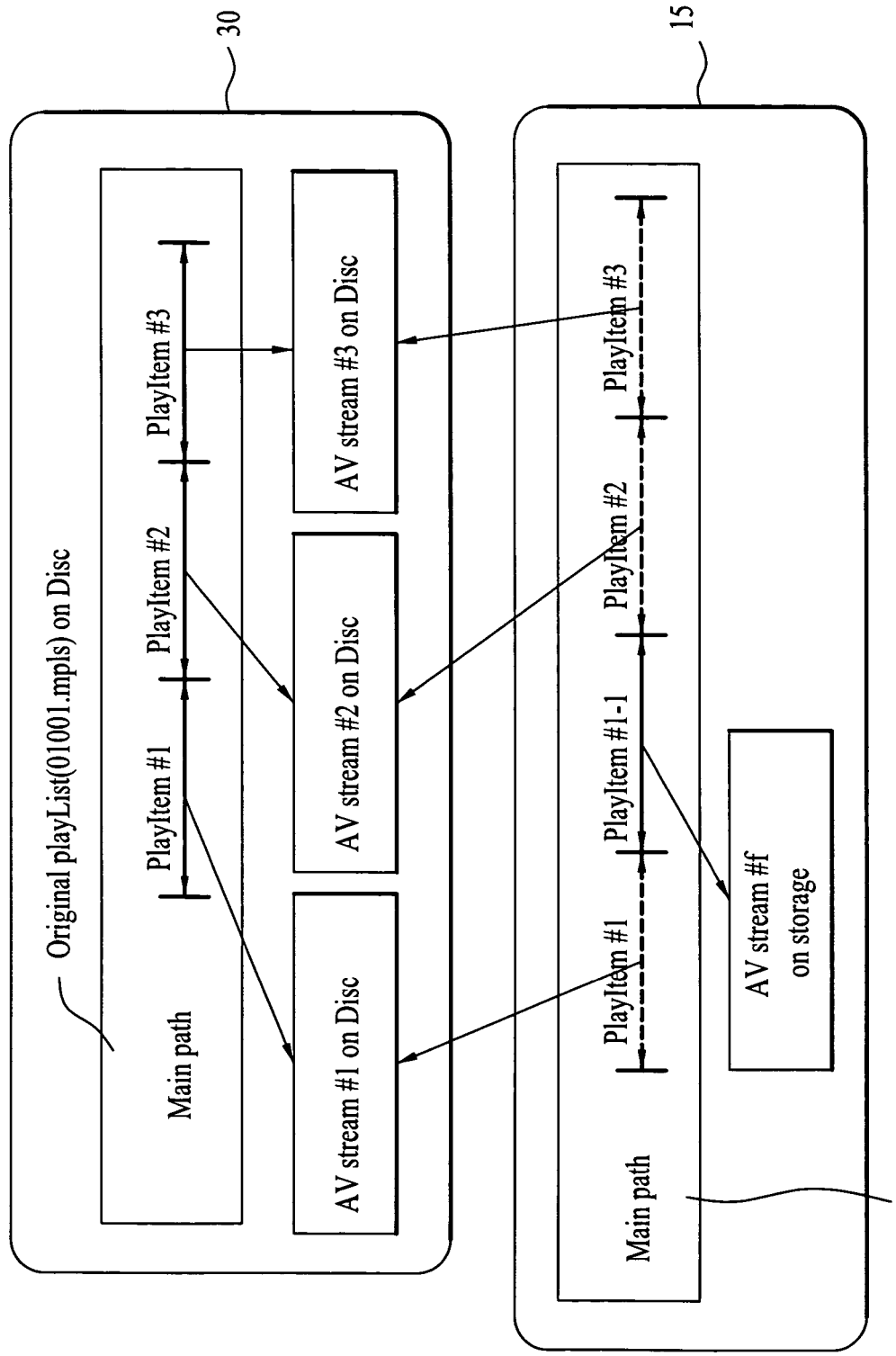
Figure 10A:
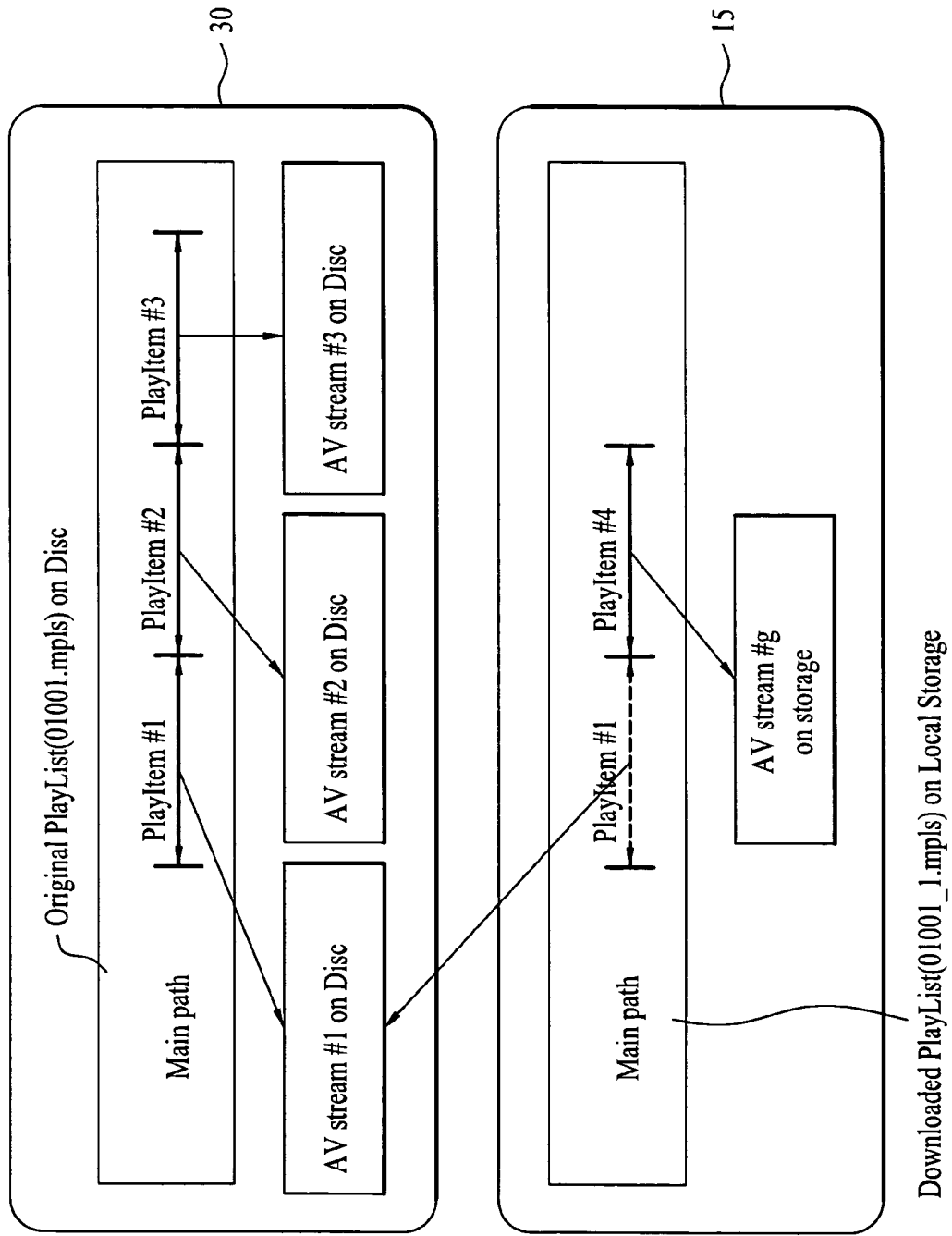

The downloaded playlists shown in FIGS. 8A, 9A, and 10A are characterized in that they reproduce not only the sub-data stored in the local storage 15 but also the main data contained in the disc, differently from the above-mentioned preferred embodiments shown in FIGS. 6A and 7A.

Figure 8B:
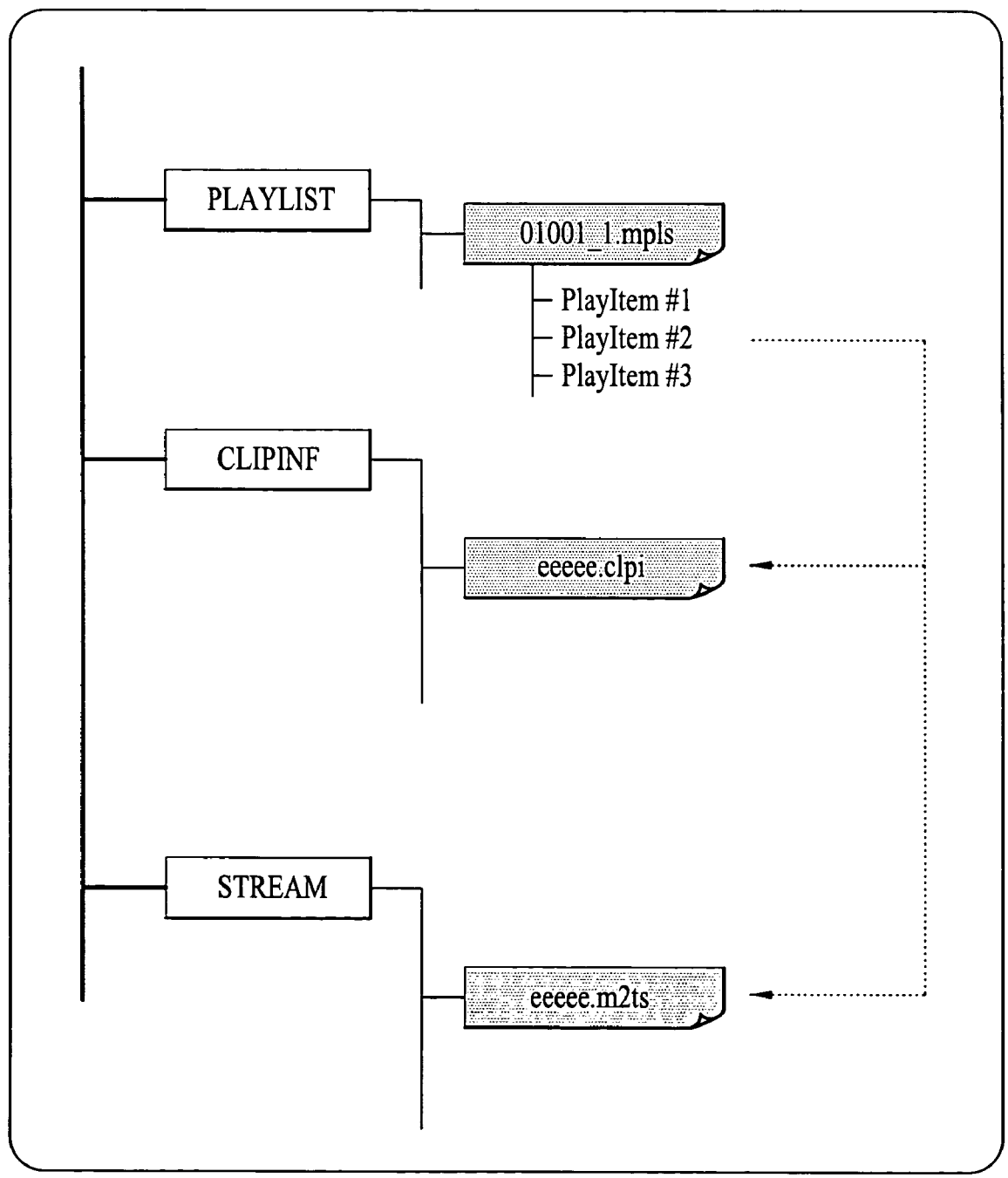
Figure 8C:
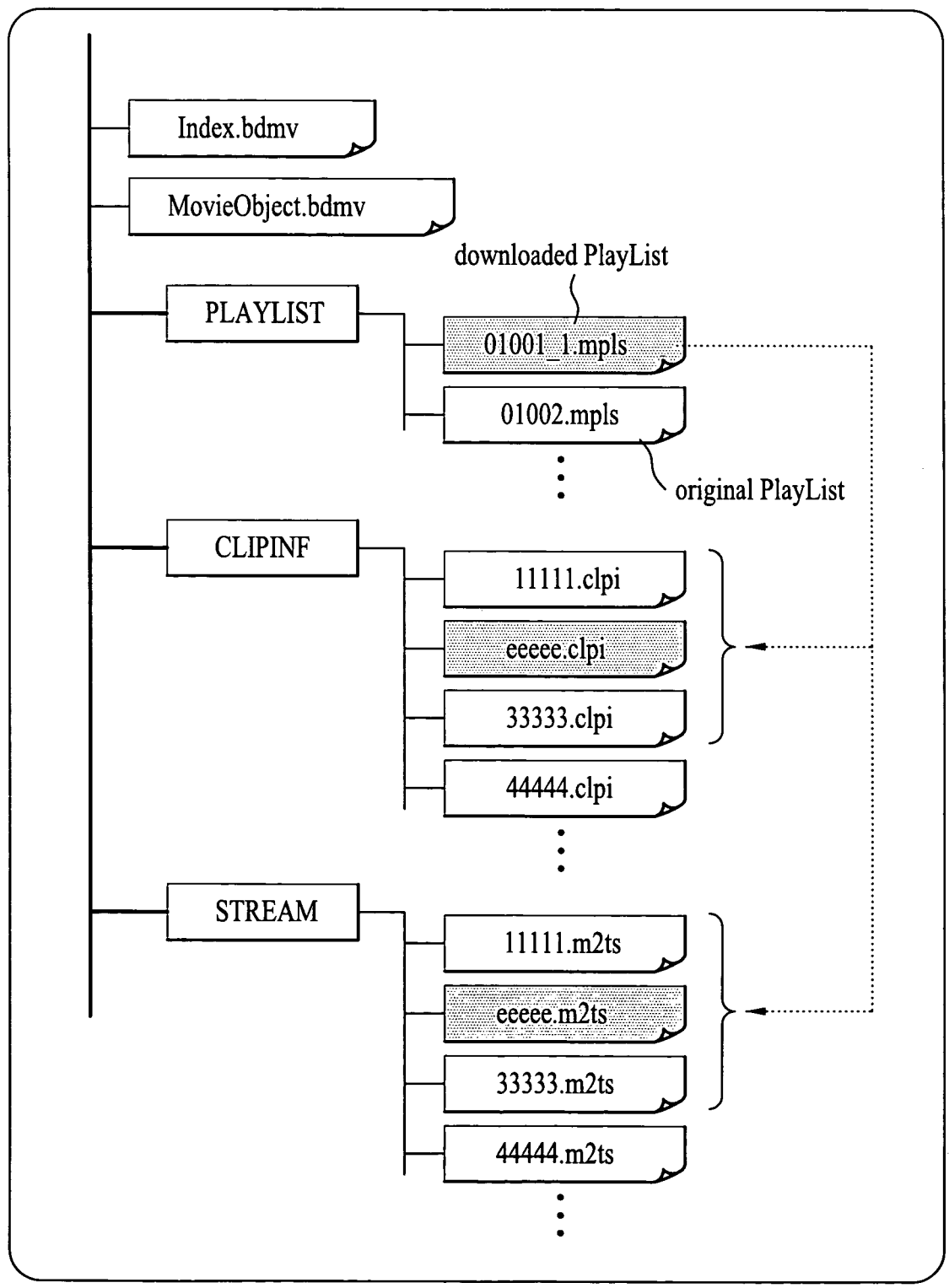

FIGS. 8A to 8C show examples in which the original playlist is replaced with the downloaded play list. For example, a specific case in which a specific main title is partially replaced with an auxiliary title is shown in FIGS. 8A to 8C. A detailed description thereof will hereinafter be given.

FIG. 8A shows the original playlist (01001.mpls) recorded in the disc 30 and the downloaded playlist (01001_1.mpls) stored in the local storage 15. In this case, the downloaded playlist (01001_1.mpls) is associated-with the original playlist (01001.mpls). Each playlist includes a plurality of playitems (PlayItem #1, PlayItem #2, and PlayItem #3) as a main path. Individual playitems are associated with reproduction of a specific AV stream.

The original playlist (01001.mpls) reproduces or manages AV streams (AV stream #1, AV stream #2, and AV stream #3) recorded in the disc using playitems (PlayItem #1, PlayItem #2, and PlayItem #3).

The downloaded playlist (01001.mpls) includes three playitems (PlayItem #1, PlayItem #2, and PlayItem #3). The playitem (PlayItem #1) reproduces and manages the AV stream (AV stream #1) as main data recorded in the disc. The playitem (PlayItem #3) reproduces and manages the AV stream (AV stream #3) as the main data recorded in the disc. The playitem (PlayItem #2) reproduces and manages an AV stream (AV stream #e) acting as sub-data stored in the local storage 15. In more detail, the original playlist (01001.mpls) is reproduced in the order of AV stream #1→AV stream #2→AV stream #3, and the downloaded playlist (01001_1.mpls) is reproduced in the order of AV stream #1→AV stream #e→AV stream #3. In conclusion, a specific AV stream #2 reproduced by the original playlist (01001.mpls) is partially replaced with the AV stream (AV stream #e) by the downloaded playlist (01001_1.mpls).

FIG. 8B shows a reproduction management file structure contained in the local storage 15 including the downloaded playlist (01001_1.mpls). The file structure of the local storage 15 includes the downloaded playlist (01003.mpls) in the playlist directory (PLAYLIST), includes a clip-info file (eeeee.clpi) in the clip-info directory (CLIPINF), and includes a stream file (33333.m2ts) in the stream directory (STREAM).

Specifically, the stream file (eeeee.m2ts) is indicative of an AV stream (AV stream #e) reproduced by the playitem (PlayItem #2) contained in the downloaded playlist (01001_1.mpls) shown in FIG. 8A. The clip-info file (eeeee.clpi) is indicative of a file capable of reproducing the stream file (eeeee.m2ts), and is contained in the file structure along with its corresponding stream file (eeeee.m2ts).

FIG. 8C shows a composite file structure, which is reproduced along with the main data using both the sub-data (i.e., AV stream #e) and the downloaded playlist (01001_1.mpls) stored in the local storage 15.

In more detail, according to the composite file structure shown in FIG. 8C, the downloaded playlist (01001_1.mpls) is added to the original playlist (01002.mpls), the clip-info file (eeeee.clpi) corresponding to the downloaded playlist (01001_1.mpls) is added to the clip-info files (11111.clpi, 33333.clpi, and 44444.clpi), and the stream file (eeeee.m2ts) is independently added to the stream files (11111.m2ts, 33333.m2ts, and 44444.m2ts).

In other words, the original playlist (01001.mpls) is replaced with the downloaded playlist (01001_1.mpls), the clip-info file (22222.clpi) is replaced with the clip-info file (eeeee.clpi) contained in the local storage 15, and the stream file (22222.m2ts) is replaced with the stream file (eeeee.m2ts).

The composite file structure includes the remaining files other than the above-mentioned added files. In this case, the remaining files other than the above-mentioned added files, for example, the original playlist (01002.mpls), the clip-info file (44444.clpi) and the stream file (44444.m2ts), are configured to have the same structure as those of files originally recorded in the disc. The index file (index.bdmv) and the object file (MovieObject.bdmv) are also included in the composite file structure without any change.

Figure 9B:
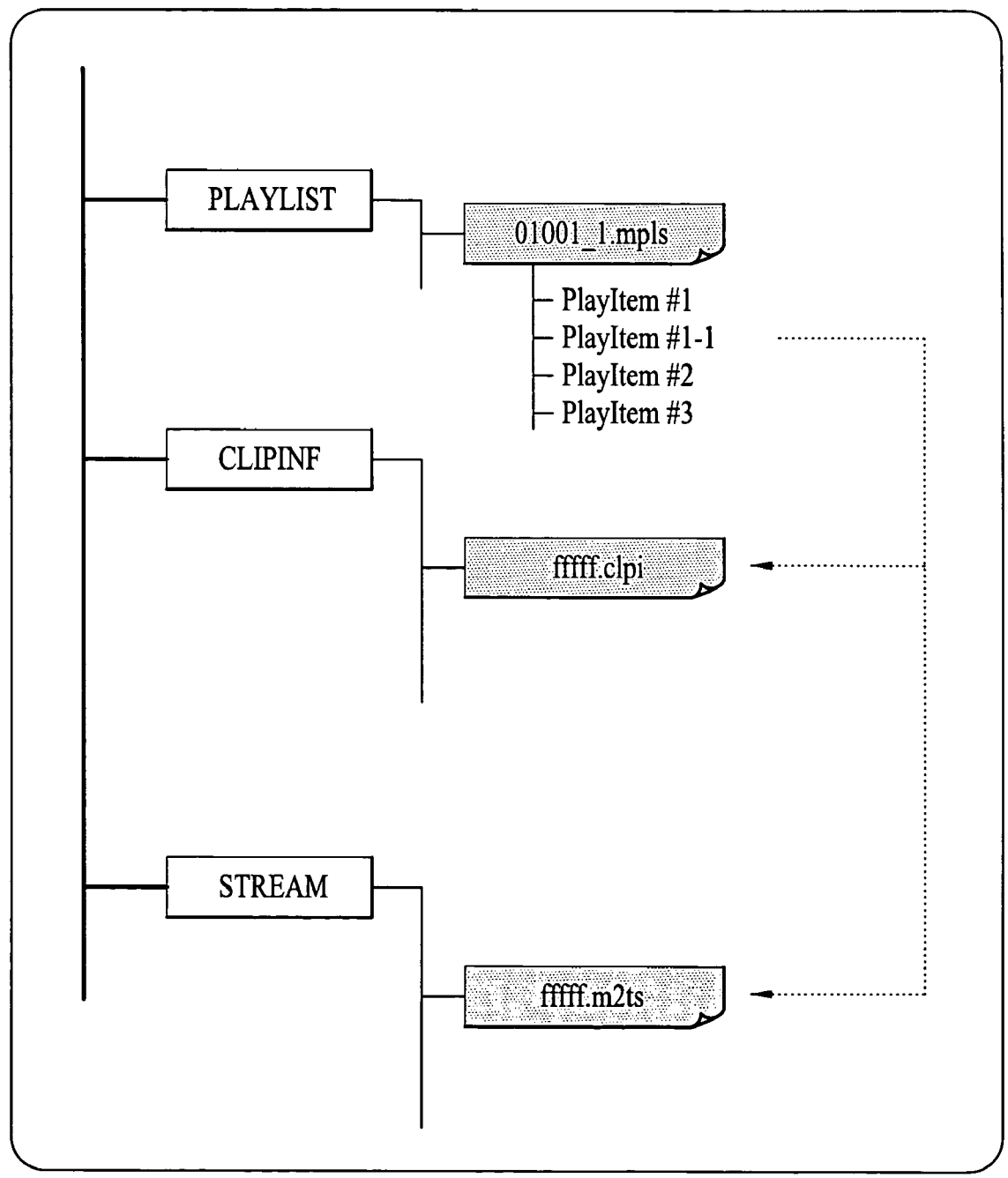
Figure 9C:
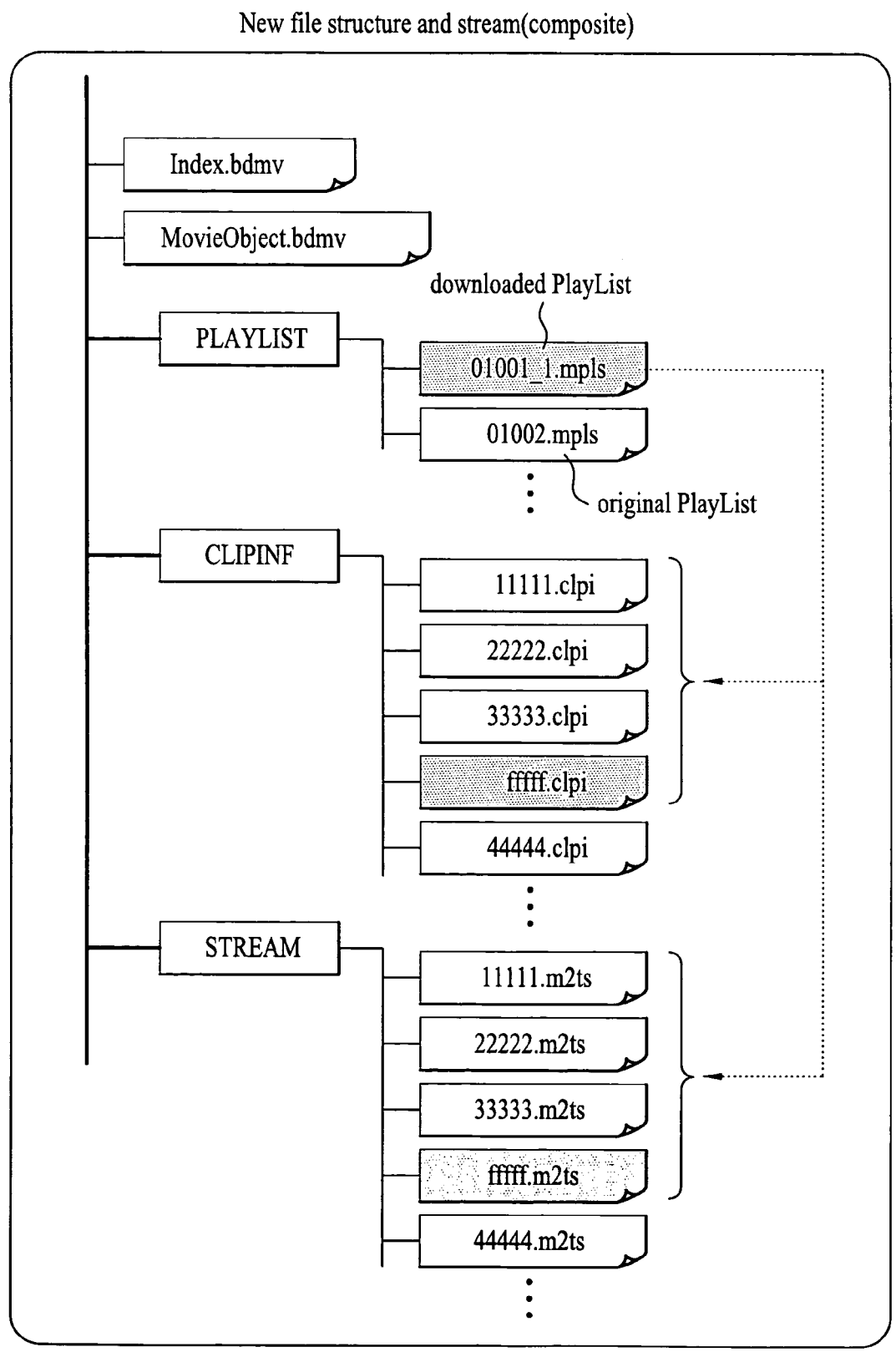

FIGS. 9A to 9C show a specific case in which the original playlist is replaced with the downloaded playlist. For example, FIGS. 9A to 9C show a predetermined case in which a specific main title is partially extended using the auxiliary title. A detailed description thereof will hereinafter be given.

FIG. 9A shows the original playlist (01001.mpls) recorded in the disc 30 and the downloaded playlist (01001_1.mpls) stored in the local storage 15. In this case, the downloaded playlist (01001_1.mpls) is associated with the original playlist (01001.mpls). The original playlist (01001.mpls) includes a plurality of playitems (PlayItem #1, PlayItem #2, and PlayItem #3) as a main path. The downloaded playlist (01001_1.mpls) includes a plurality of playitems (PlayItem #1, PlayItem #1-1, PlayItem #2, PlayItem #3) as a main path. Individual playitems are associated with reproduction of a specific AV stream.

The original playlist (01001.mpls) reproduces or manages AV streams (AV stream #1, AV stream #2, and AV stream #3) recorded in the disc using playitems (PlayItem #1, PlayItem #2, and PlayItem #3).

The downloaded playlist (01001_1.mpls) includes four playitems (PlayItem #1, PlayItem #1-1, PlayItem #2, and PlayItem #3). The playitem (PlayItem #1) reproduces and manages the AV stream (AV stream #1) as main data recorded in the disc. The playitem (PlayItem #2) reproduces and manages the AV stream (AV stream #2) as the main data recorded in the disc. The playitem (PlayItem #3) reproduces and manages an AV stream (AV stream #3) as the main data recorded in the disc. The playitem (PlayItem #1-1) reproduces and manages an AV stream (AV stream #f) as sub-data stored in the local storage 15. In more detail, the original playlist (01001.mpls) is reproduced in the order of AV stream #1→AV stream #2→AV stream #3, and the downloaded playlist (01001_1.mpls) is reproduced in the order of AV stream #1→AV stream #f→AV stream #2→AV stream #3. In conclusion, it can be recognized that a specific AV stream #f is additionally extended by the downloaded playlist (01001_1.mpls).

FIG. 9B shows a file structure contained in the local storage 15 including the downloaded playlist (01001_1.mpls). The file structure of the local storage 15 includes the downloaded playlist (01601_1.mpls) in the playlist directory (PLAYLIST), includes a clip-info file (fffff.clpi) in the clip-info directory (CLIPINF), and includes a stream file (fffff.m2ts) in the stream directory (STREAM).

Specifically, the stream file (fffff.m2ts) is indicative of an AV stream (AV stream #f) reproduced by the playitem (PlayItem #1-1) contained in the downloaded playlist (01001_1.mpls) shown in FIG. 9A. The clip-info file (fffff.clpi) is indicative of a file capable of reproducing the stream file (fffff.m2ts), and is contained in the file structure along with its corresponding stream file (fffff.m2ts)

FIG. 9C shows a composite file structure, which is reproduced along with the main data using both the sub-data (i.e., AV stream #,f) and the downloaded playlist (01001_1.mpls) stored in the local storage 15.

In more detail, according to the composite file structure shown in FIG. 9C, the downloaded playlist (01001.mpls) is added to the original playlist (01002.mpls), the clip-info file (fffff.clpi) corresponding to the downloaded playlist (01001_1.mpls) is added to the clip-info files (11111.clpi, 22222.clpi, 33333.clpi, and 44444.clpi), and the stream file (fffff.m2ts) is independently added to the stream files (11111.m2ts, 22222.m2ts, 33333.m2ts, and 44444.m2ts). In other words, the original playlist (01001.mpls) is replaced with the downloaded playlist (01001_1.mpls), and the clip-info file (fffff.clpi) and the stream file (fffff.m2ts) are added in the local storage 15.

The index file (index.bdmv) and the object file (MovieObject.bdmv) are contained in the composite file structure without any change.

Figure 10B:
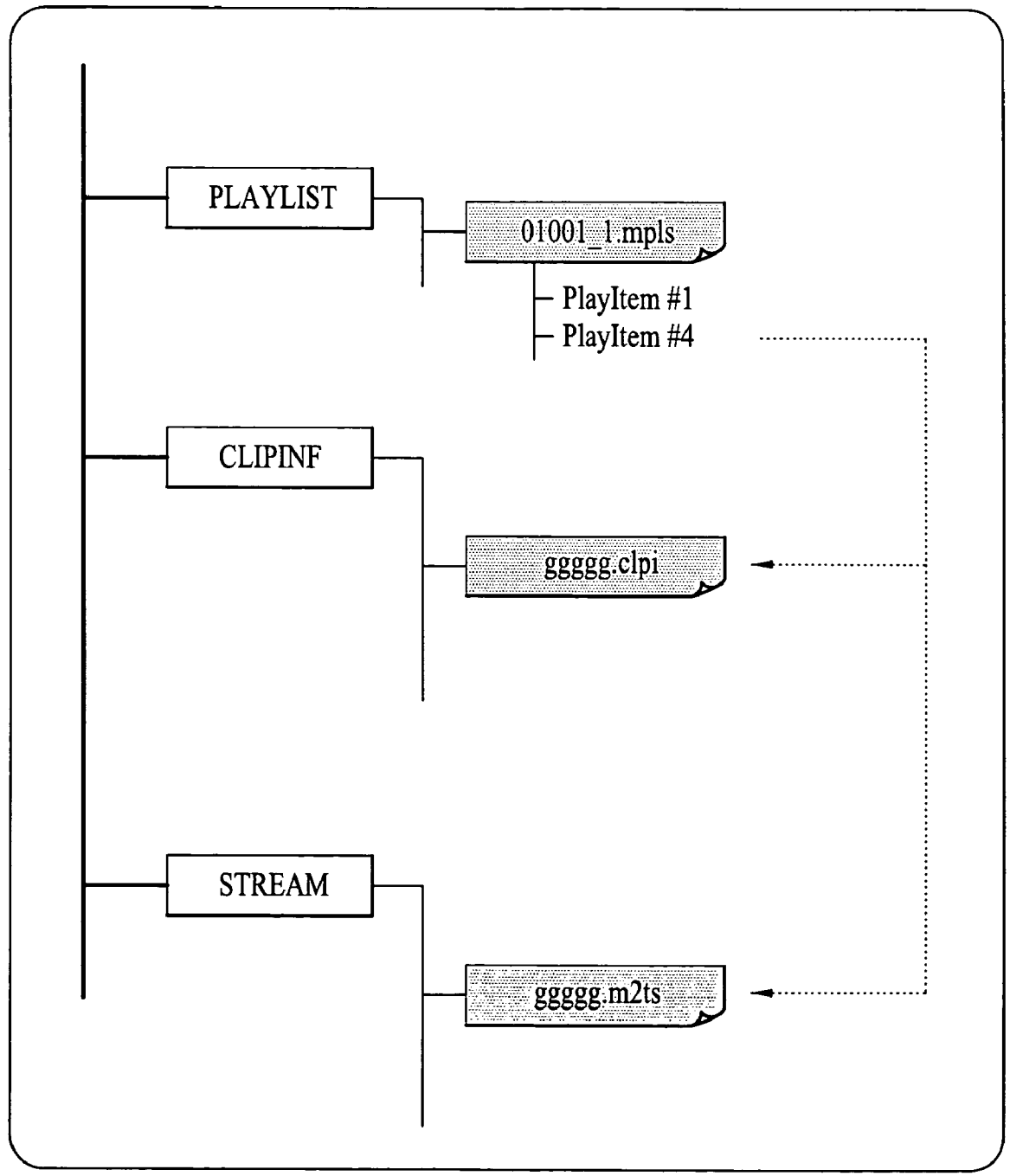
Figure 10C:
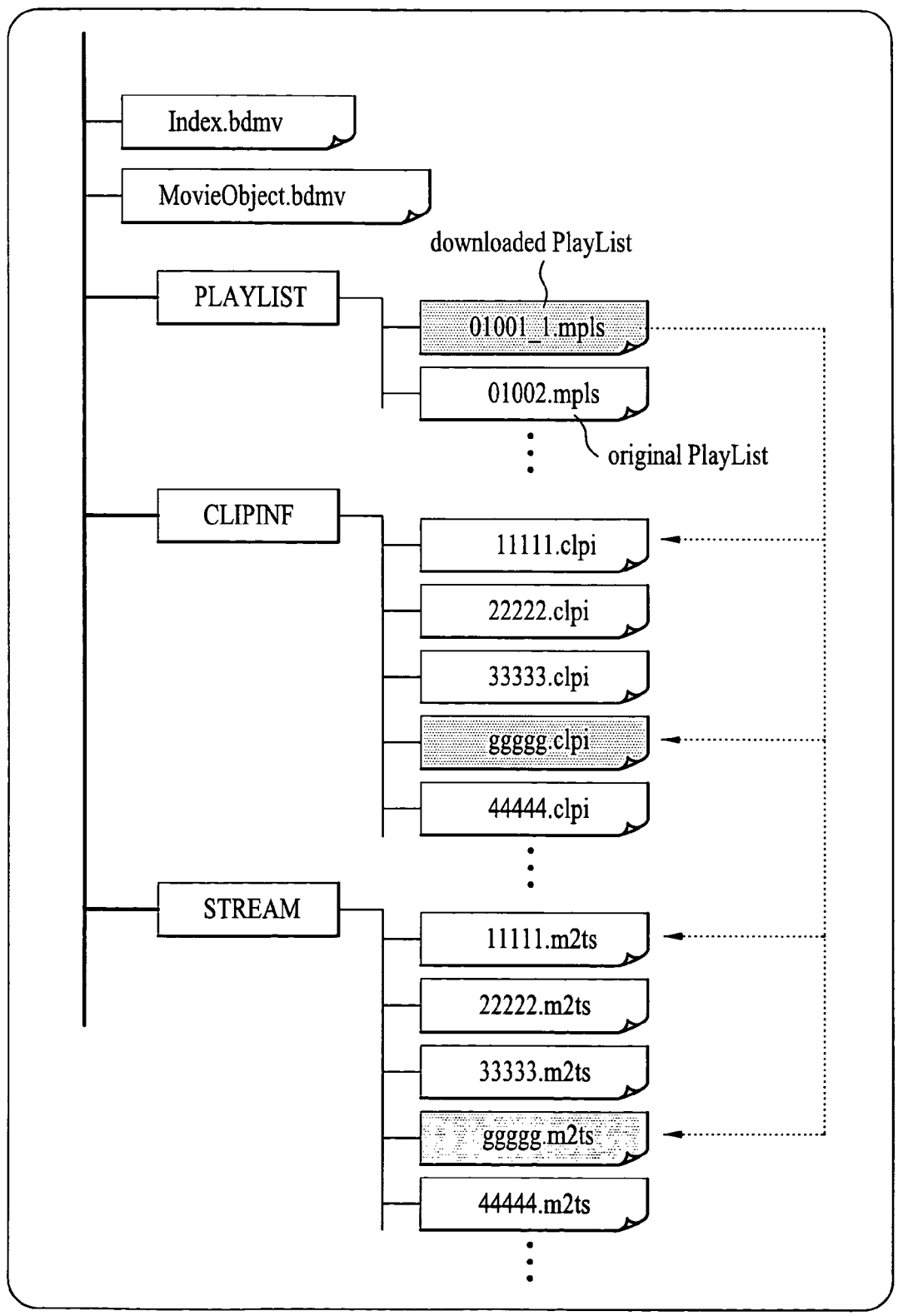

FIGS. 10A to 10C show a specific case in which the original playlist is replaced with the downloaded playlist. For example, FIGS. 10A to 10C show a predetermined case in which a specific main title is partially changed using the auxiliary title. A detailed description thereof will hereinafter be described.

FIG. 10A shows the original playlist (01001.mpls) recorded in the disc 30 and the downloaded playlist (01001_1.mpls) stored in the local storage 15. In this case, the downloaded playlist (01001_1.mpls) is associated with the original playlist (01001.mpls). The original playlist (01001.mpls) includes a plurality of playitems (PlayItem #1, PlayItem #2, and PlayItem #3) as a main path. The downloaded playlist (01001_1.mpls) includes a plurality of playitems (PlayItems #1~#3, or PlayItems #1 and #4) as a main path. Individual playitems are associated with reproduction of a specific AV stream.

The original playlist (01001.mpls) reproduces or manages AV streams (AV stream #1, AV stream #2, and AV stream #3) recorded in the disc using playitems (PlayItem #1, PlayItem #2, and PlayItem #3).

The downloaded playlist (01001_1.mpls) includes two playitems (PlayItem #1 and PlayItem #4). The playitem (PlayItem #1) reproduces and manages the AV stream (AV stream #1) as main data recorded in the disc. The playitem (PlayItem #4) reproduces and manages the AV stream (AV stream #g) acting as sub-data stored in the local storage 15. In more detail, the original playlist (01001.mpls) is reproduced in the order of AV stream #1→AV stream #2→AV stream #3, and the downloaded playlist (01001_1.mpls) is reproduced in the order of AV stream #1→AV stream #g. In conclusion, it can be recognized that AV streams (AV stream #2 and AV stream #3) are deleted by the downloaded playlist (01001_1.mpls), and the AV stream (AV stream #f) is added by the downloaded playlist (01001_1.mpls).

FIG. 10B shows a file structure contained in the local storage 15 including the downloaded playlist (01001_1.mpls). The file structure of the local storage 15 includes the downloaded playlist (01001_1.mpls) in the playlist directory (PLAYLIST), includes a clip-info file (ggggg.clpi) in the clip-info directory (CLIPINF), and includes a stream file (ggggg.m2ts) in the stream directory (STREAM).

Specifically, the stream file (ggggg.m2ts) is indicative of an AV stream (AV stream #g) reproduced by the playitem (PlayItem #4) contained in the downloaded playlist (01001_1.mpls) shown in FIG. 10A. The clip-info file (ggggg.clpi) is indicative of a file capable of reproducing the stream file (ggggg.m2ts), and is contained in the file structure along with its corresponding stream file (ggggg.m2ts).

FIG. 10C shows a composite file structure, which is reproduced along with the main data using both the sub-data (i.e., AV stream #g) and the downloaded playlist (01001_1.mpls) stored in the local storage 15.

In more detail, according to the composite file structure shown in FIG. 10C, the downloaded playlist (01001_1.mpls) is added to the original playlist (01002.mpls), the clip-info file (ggggg.clpi) corresponding to the downloaded playlist (01001_1.mpls) is added to the clip-info files (11111.clpi, 22222.clpi, 33333.clpi, and 44444.clpi), and the stream file (ggggg.m2ts) is independently added to the stream files (11111.m2ts, 22222.m2ts, 33333.m2ts, and 44444.m2ts). In other words, the original playlist (01001.mpls) is, replaced with the downloaded playlist (01001_1.mpls), and the clip-info files (11111.clpi and ggggg.clpi) and the stream files (11111.m2ts and ggggg.m2ts) are reproduced by the downloaded playlist (01001_1.mpls).

In association with the above-mentioned operations, the clip-info files (22222.clpi and 33333.clpi) and the stream files (22222.m2ts and 33333.m2ts) may also be reproduced by other original playlists instead of files used by the downloaded playlist, such that the clip-info and stream files remain in the composite file structure without any change. If the above-mentioned clip-info and stream files are not employed by other original playlists, it is preferable that the above-mentioned clip-info and stream files are excluded from the composite file structure.

The index file (index.bdmv) and the object file (MovieObject.bdmv) are contained in the composite file structure without any change.

Figure 11A:
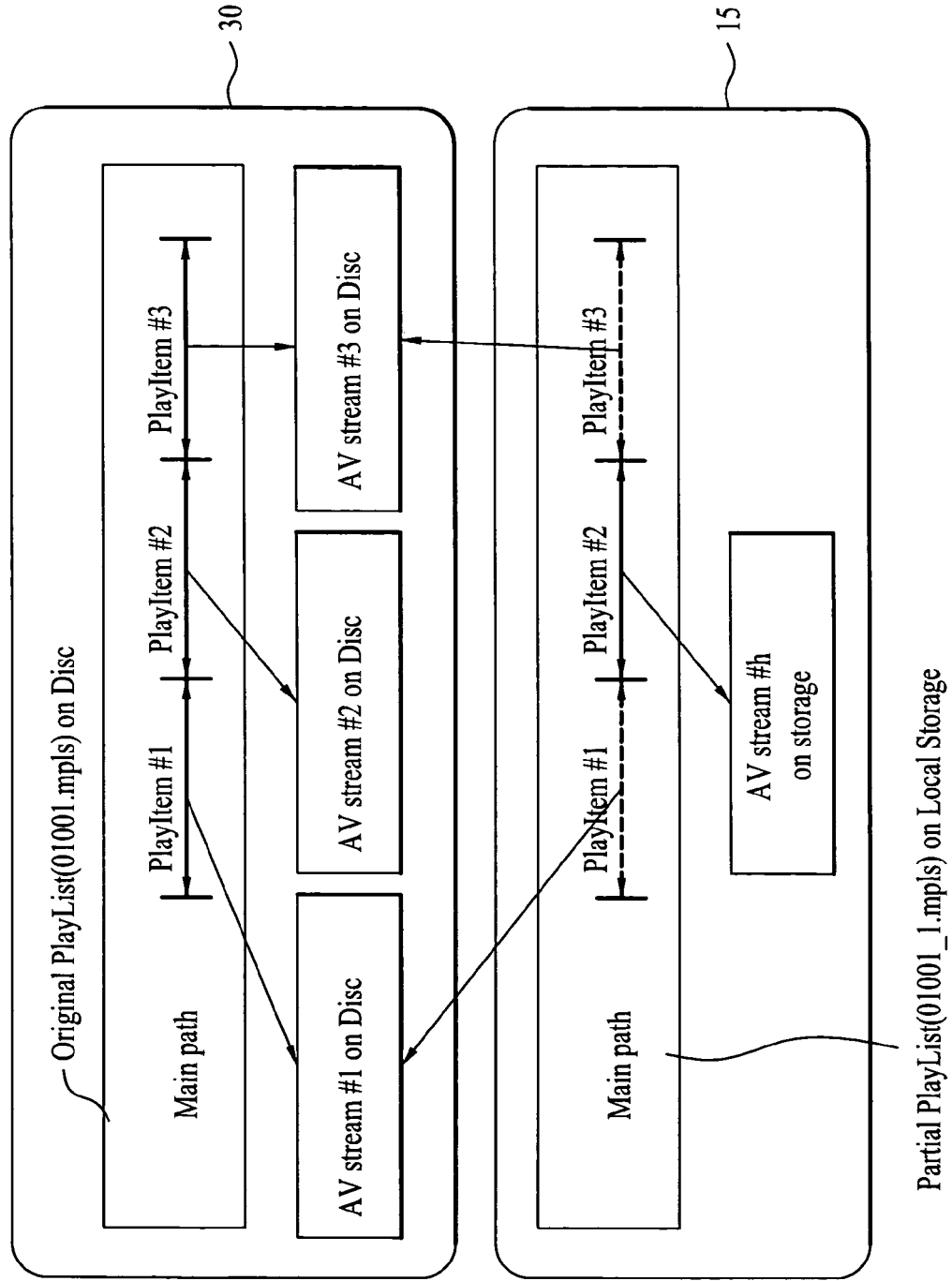
Figure 11B:
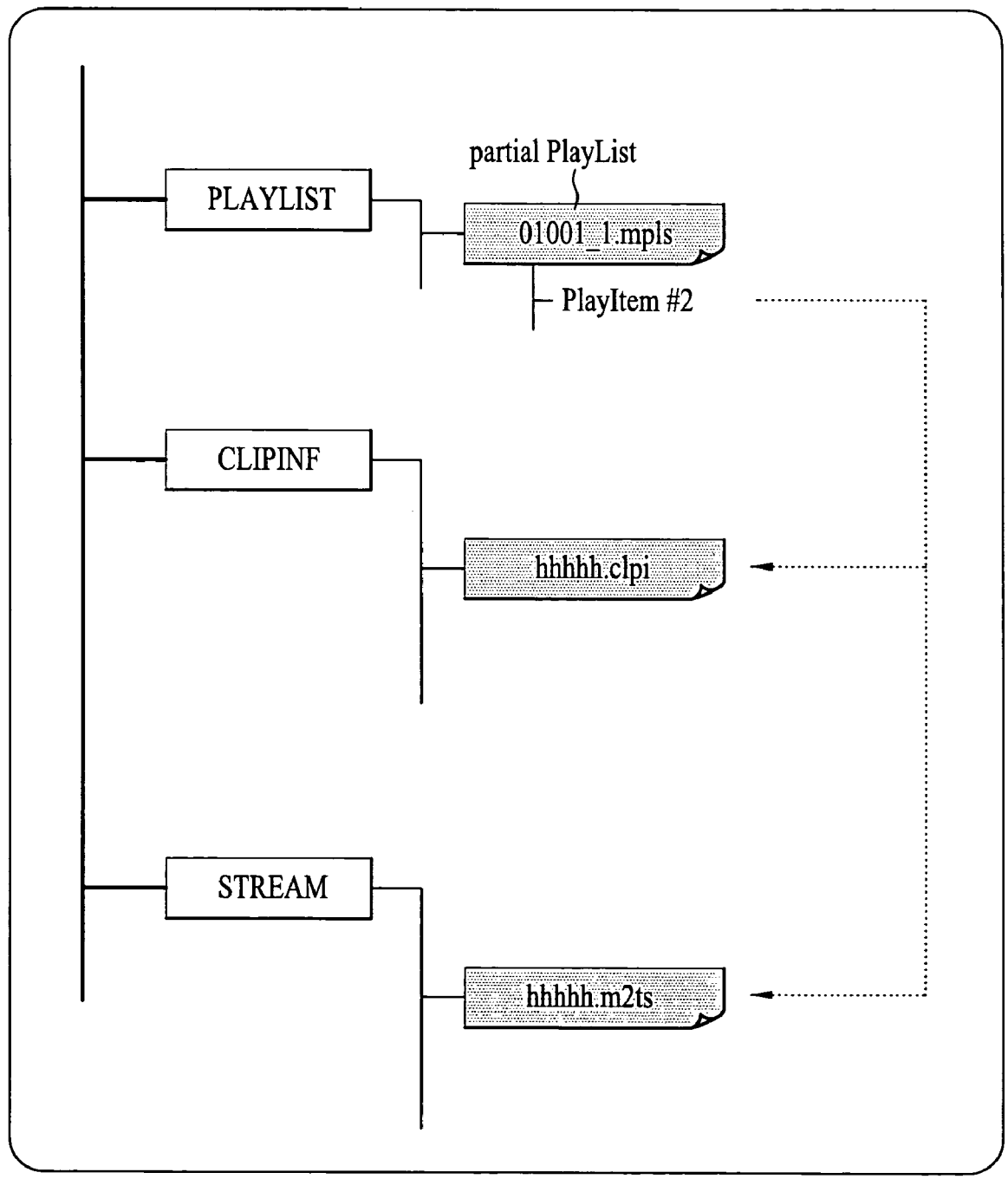
Figure 11C:
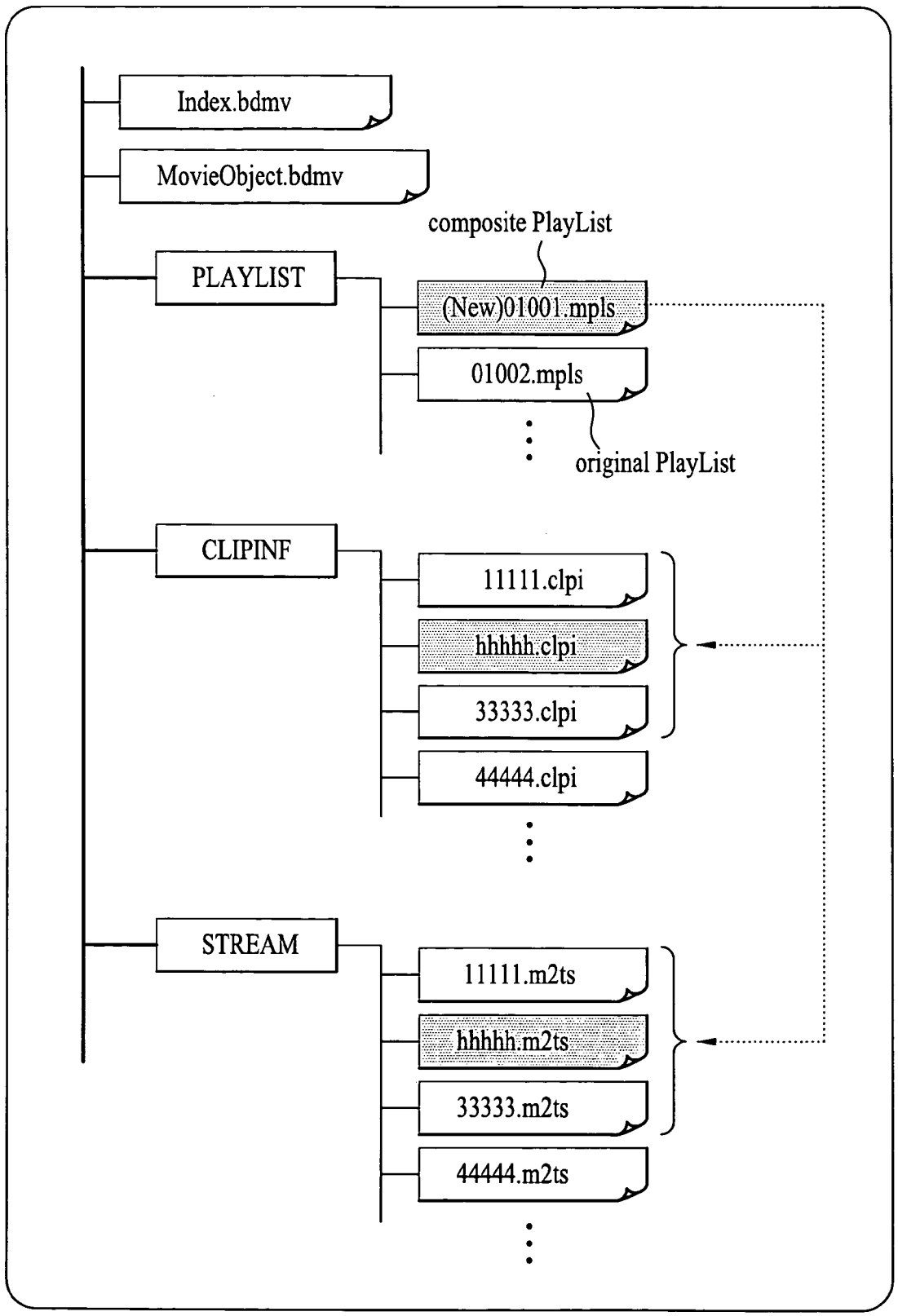

FIGS. 11A to 11C show a variety of examples in which the composite file structure is formed by combining the main data and the sub-data, when the composite file structure according to the present invention is formed. The preferred embodiment shown in FIGS. 11A to 11C is characterized in that a composite playlist for reproducing the main data and the sub-data is formed and is included in the composite file structure.

The preferred embodiment shown in FIG. 11A includes a playitem for reproducing only the sub-data in the downloaded playlist, differently from other preferred embodiments shown in FIGS. 8A to 10C.

FIGS. 11A to 11C show a specific case in which a composite playlist is formed by combining the downloaded playlist and the original playlist. For example, FIGS. 11A to 11C show a predetermined case in which a specific main title is partially changed using the auxiliary title. A detailed description thereof will hereinafter be described.

FIG. 11A shows the original playlist (01001.mpls) recorded in the disc 30 and the downloaded playlist (01001_1.mpls) stored in the local storage 15. In this case, the downloaded playlist (01001_1.mpls) is associated with the original playlist (01001.mpls). The original playlist (01001.mpls) includes a plurality of playitems (PlayItem #1, PlayItem #2, and PlayItem #3) as a main path. The downloaded playlist (01001_1.mpls) includes a playitem (PlayItem #2) as a main path.

The original playlist (01001.mpls) is reproduced in the order of AV stream #1→AV stream #2→AV stream #3, and the downloaded playlist (01001_1.mpls) is reproduced in the order of AV stream #1→AV stream #h→AV stream #3. It should be noted that only the AV stream 3h is stored in the local storage 15.

In conclusion, it can be recognized that a specific AV stream (AV stream #2) reproduced by the original playlist (01001.mpls) can be replaced with an AV stream (AV stream #h) by the downloaded playlist (01001_1.mpls).

FIG. 11B shows a file structure contained in the local storage 15 including the downloaded playlist (01001_1.mpls). The file structure of the local storage 15 includes the downloaded playlist (01001_1.mpls) in the playlist directory (PLAYLIST), includes a clip-info file (hhhhh.clpi) in the clip-info directory (CLIPINF), and includes a stream file (hhhhh.m2ts) in the stream directory (STREAM).

Specifically, the downloaded playlist (01001_1.mpls) of the reproduction management file structure shown in FIG. 11B includes only one playitem (PlayItem #2) for only one AV stream (AV stream #h) acting as sub-data present in the local storage 15, differently from the above-mentioned preferred embodiments shown in FIGS. 8A to 10C. Specifically, the above-mentioned downloaded playlist (01001_1.mpls) is also called a "Partial Playlist".

Therefore, in order to perform a desired reproduction operation according to a predetermined sequence (e.g., in the order of AV stream #1→AV stream #h→AV stream #3, there is needed a composite playlist (i.e., new 01001_1.mpls) formed by combining the downloaded playlist (01001_1.mpls) and the original playlist (01001.mpls).

FIG. 11C shows a composite file structure, which is reproduced along with the main data using both the sub-data (i.e., AV stream #h) and the downloaded playlist (01001_1.mpls) stored in the local storage 15.

In more detail, the composite file structure includes a composite playlist, which is formed by combining the downloaded playlist (01001_1.mpls) of FIG. 11B and the original playlist (01001.mpls) recorded in the disc.

According to the composite file structure shown in FIG. 11C, the clip-info files (11111.clpi, hhhhh.clpi, and 33333.clpi) corresponding to the composite playlist and the stream files (11111.m2ts, hhhhh.m2ts, and 33333.m2ts) are further included in the composite file structure shown in FIG. 11C, along with another original playlist (01002.mpls) recorded in the disc, the clip-info file (44444.clpi), and the stream file (44444.m2ts).

In other words, the original playlist (01001.mpls) is replaced with the composite playlist combined with the downloaded playlist (01001_1.mpls), the clip-info file (22222.clpi) is replaced with the clip-info file stored in the local storage 15, and the stream file (22222.m2ts) is replaced with the stream file (hhhhh.m2ts) stored in the local storage 15.

The index file (index.bdmv) and the object file (MovieObject.bdmv) are contained in, the composite file structure without any change.

In association with the above-mentioned description, it is obvious that the term "Partial Playlist" will be indicative of a modified usage of the file structure shown in FIG. 10A, and this modification may be equally applied to the above-mentioned preferred embodiments.

FIGS. 12A to 13C show a variety of examples in which only the main data is reproduced, when the composite file structure according to the present invention is formed. The preferred embodiment shown in FIGS. 12A to 13C is characterized in that the downloaded playlist for reproducing the main data and the original playlist are included in the composite file structure.

The preferred embodiment shown in FIGS. 12A to 13C does not include an AV stream in the local storage 15, but includes only the downloaded playlist capable of reproducing the main data, differently from the above-mentioned preferred embodiments in FIGS. 8A to 11C.

Figure 12A:
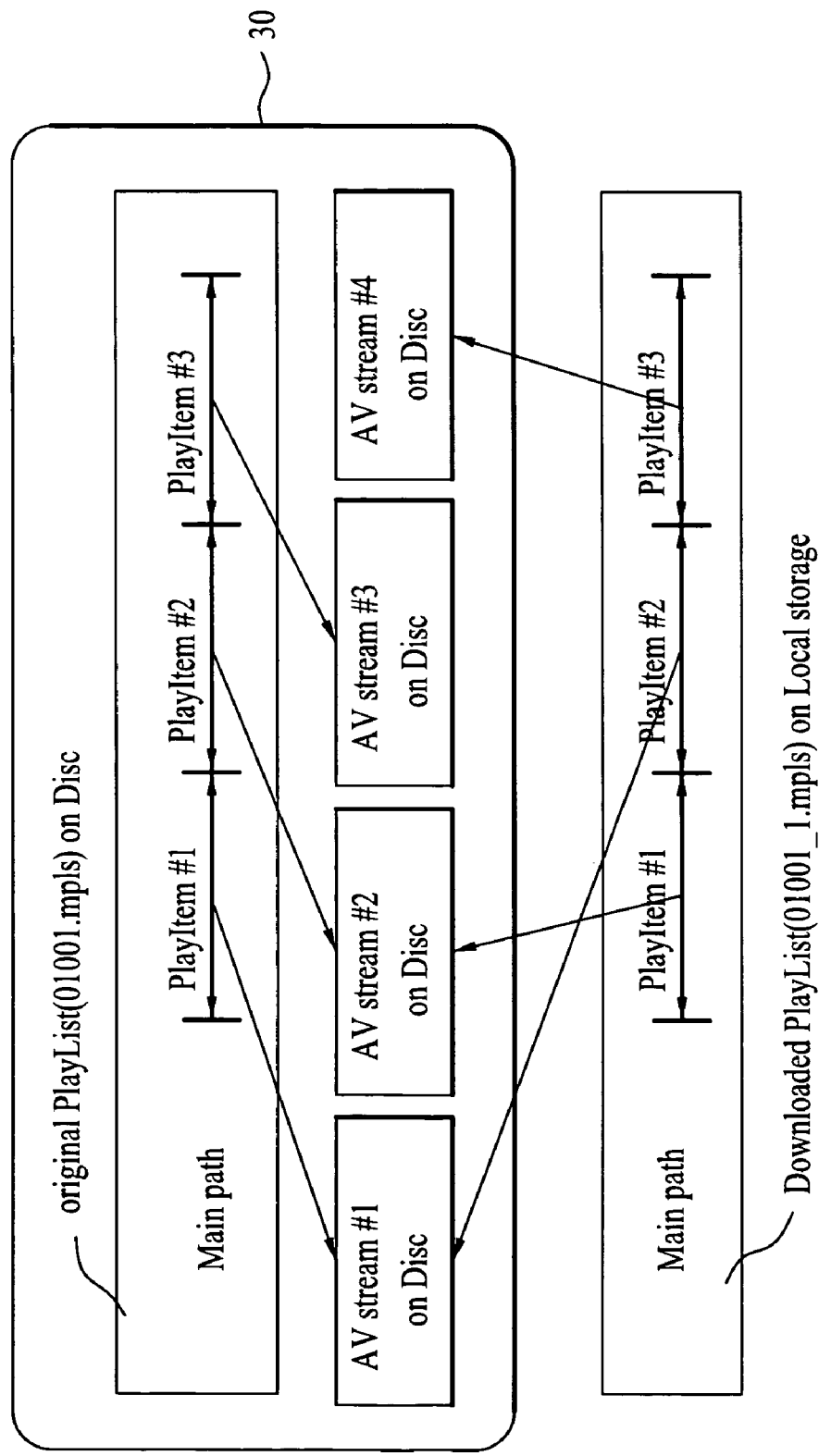
FIGS. 12A to 13C show a variety of examples constructing yet another preferred embodiment associated with a method for configuring a composite file structure according to the present invention.
Figure 12B:
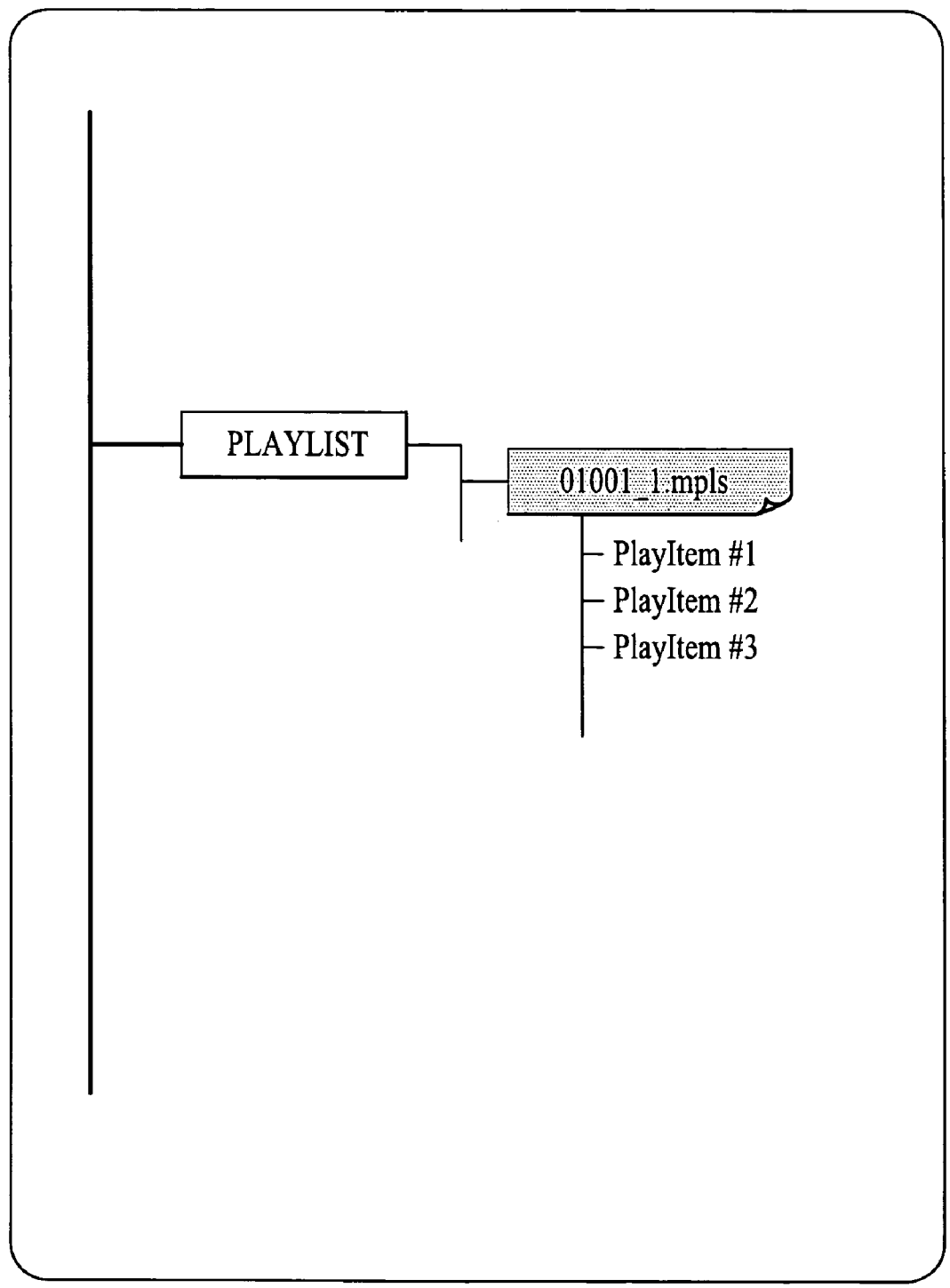
Figure 12C:
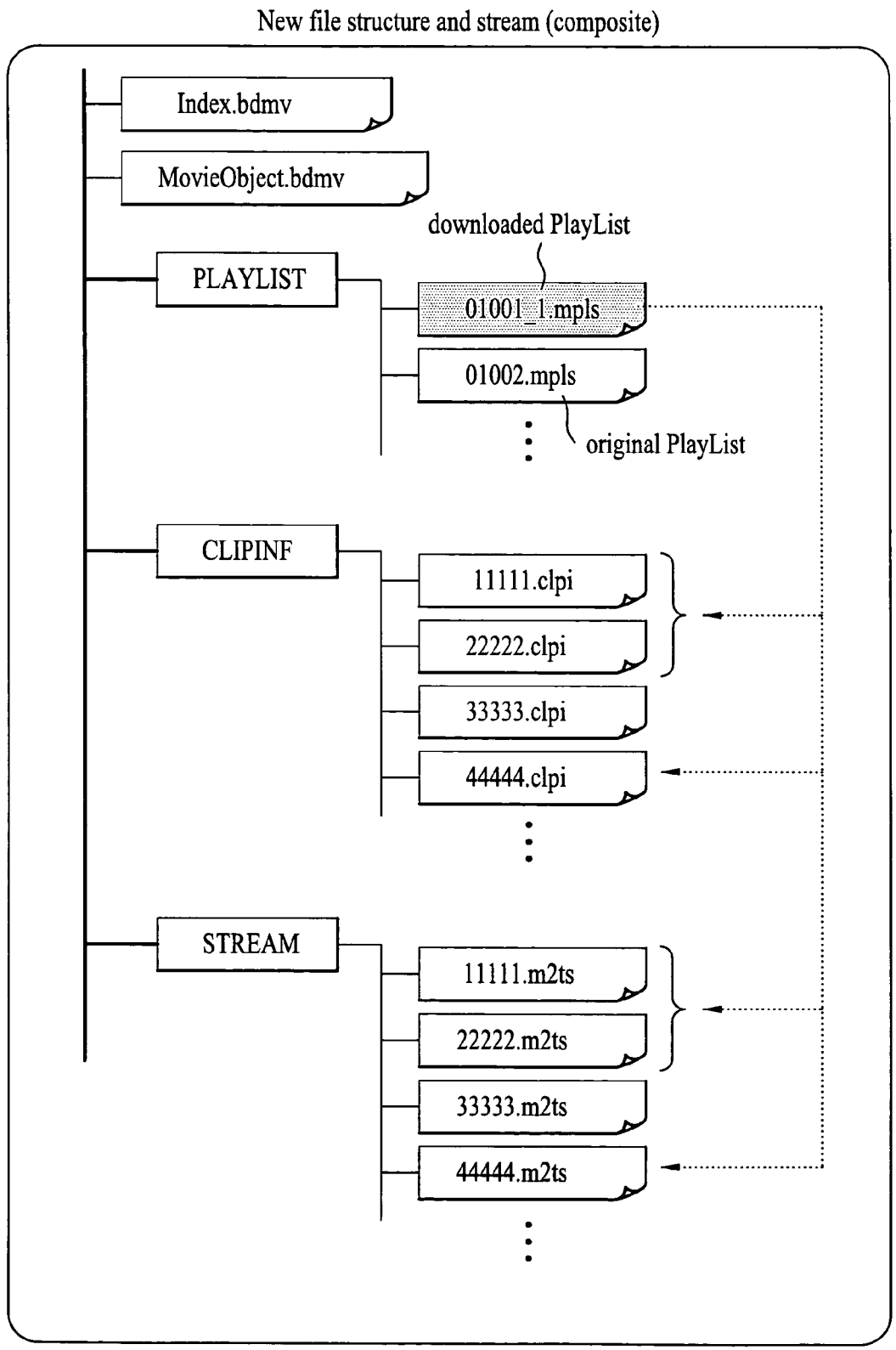

FIGS. 12A to 12C show a specific case in which the original playlist is replaced with the downloaded playlist. For example, according to the preferred embodiment shown in FIGS. 12A to 12C, only reproduction management information (e.g., the downloaded playlist) is downloaded in the local storage 15, and the AV stream is not downloaded in the local storage 15. In other words, a specific case in which the main data recorded in the disc is reproduced using the downloaded playlist is shown in FIGS. 12A to 12C. Therefore, the above-mentioned preferred embodiment shown in FIGS. 12A to 12C can be applied to a method for changing/editing a reproduction scenario by the original playlist contained in the disc.

FIG. 12A shows the original playlist (01001.mpls) recorded in the disc 30 and the downloaded playlist (01001_1.mpls) stored in the local storage 15. In this case, the downloaded playlist (01001_1.mpls) is associated with the original playlist (01001.mpls). The original playlist (01001.mpls) includes a plurality of playitems (PlayItem #1, PlayItem #2, and PlayItem #3) as a main path. The downloaded playlist (01001_1.mpls) includes a plurality of playitems (PlayItem #1, PlayItem #2, and PlayItem #3) as a main path.

The original playlist (01001.mpls) reproduces or manages AV streams (AV stream #1, AV stream #2, and AV stream #3) recorded in the disc using playitems (PlayItem #1, PlayItem #2, and PlayItem #3).

The downloaded playlist (01001_1.mpls) includes three playitems (PlayItem #1, PlayItem #2, and PlayItem #3). The playitem (PlayItem #1) reproduces and manages the AV stream (AV stream #2) as main data recorded in the disc. The playitem (PlayItem #2) reproduces and manages the AV stream (AV stream #1) as main data recorded in the disc. The playitem (PlayItem #3) reproduces and manages the AV stream (AV stream #4) as main data recorded in the disc.

In more detail, the original playlist (01001.mpls) is reproduce in the order of AV stream #1→AV stream #2→AV stream #3, and the downloaded playlist (01001_1.mpls) is reproduced in the order of AV stream #2→AV stream #1→AV stream #4. In conclusion, it can be recognized that the order of AV streams reproduced by the original playlist is changed to another order by the downloaded playlist (01001_1.mpls) due to scenario change/edition operations.

FIG. 12B shows a reproduction management file structure contained in the local storage 15 including the downloaded playlist (01001_1.mpls) The file structure of the local storage 15 includes only the downloaded playlist (01001_1.mpls) in the playlist directory (PLAYLIST), and does not include the clip-info directory (CLIPINF) and the stream directory (STREAM).

As stated above, the downloaded playlist (01001_1.mpls) includes only the playitems (PlayItem #1, PlayItem #2, and PlayItem #3) capable of reproducing the AV streams (AV stream #2, AV stream #1, and AV stream #4) as main data, respectively.

FIG. 12C shows a composite file structure, which is reproduced along with the main data using the downloaded playlist (01001_1.mpls).

In more detail, according to the composite file structure shown in FIG. 12C, the original playlist (01001.mpls) is replaced with the downloaded playlist (01001_1.mpls), and the remaining files have the same structure as the file structure recorded in the disc.

The files reproduced by the newly-replaced downloaded playlist (01001_1.mpls) are determined to be clip-info files (11111.clpi, 22222.clpi, and 44444.clpi) and stream files (11111.m2ts, 22222.m2ts, and 44444.m2ts).

The index file (index.bdmv) and the object file (MovieObject.bdmv) are contained in the composite file structure without any change.

Figure 13A:
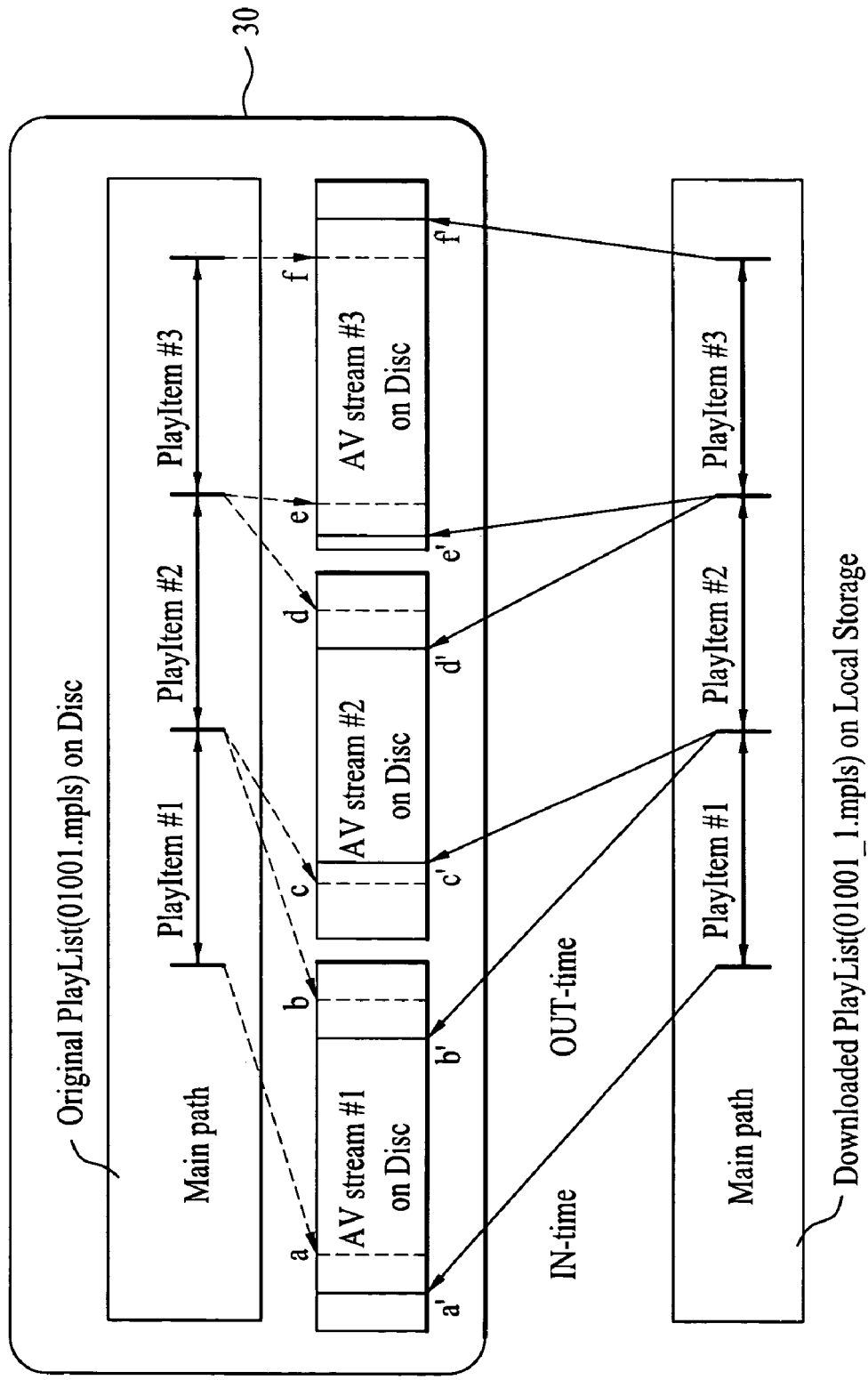
Figure 13B:
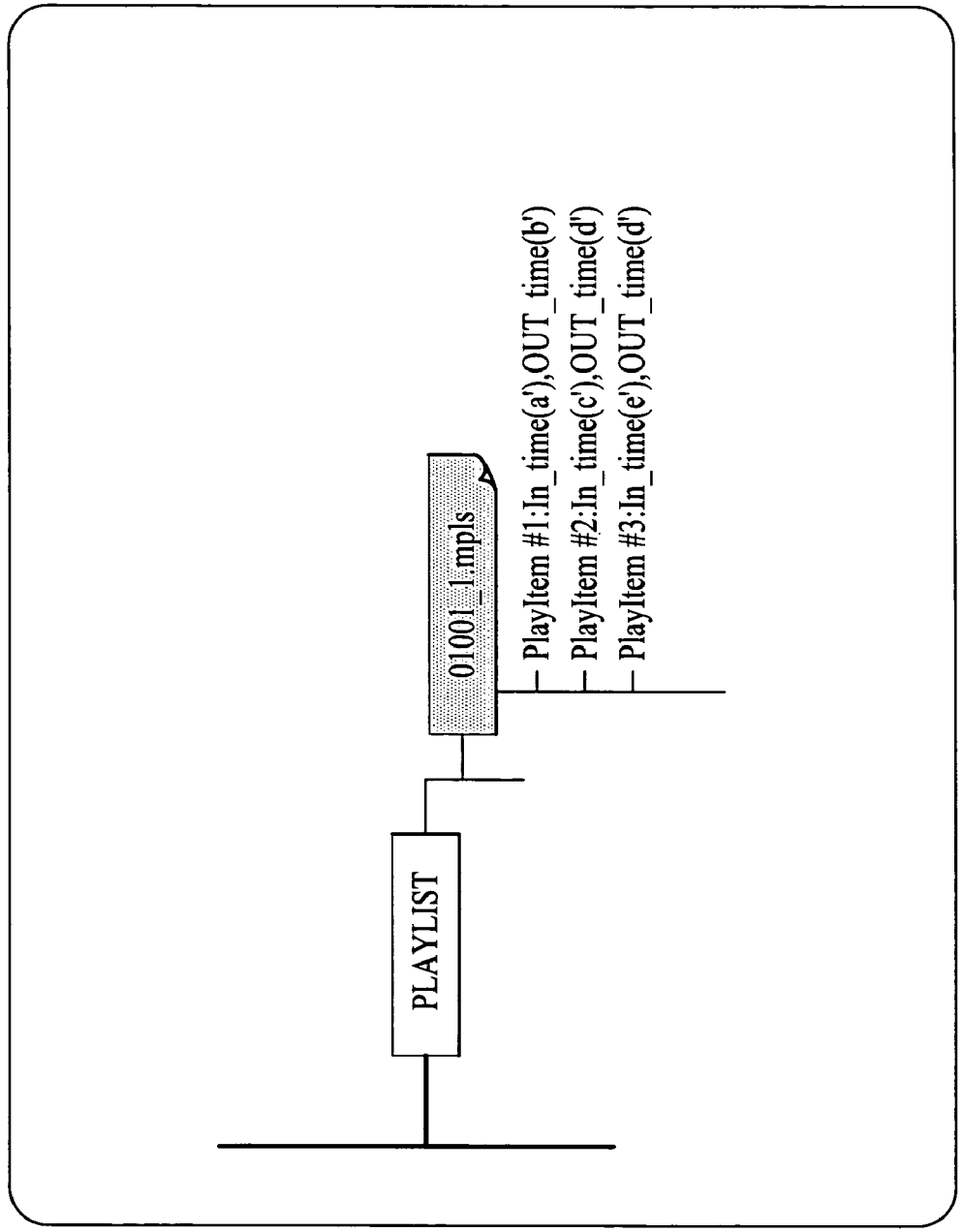
Figure 13C:
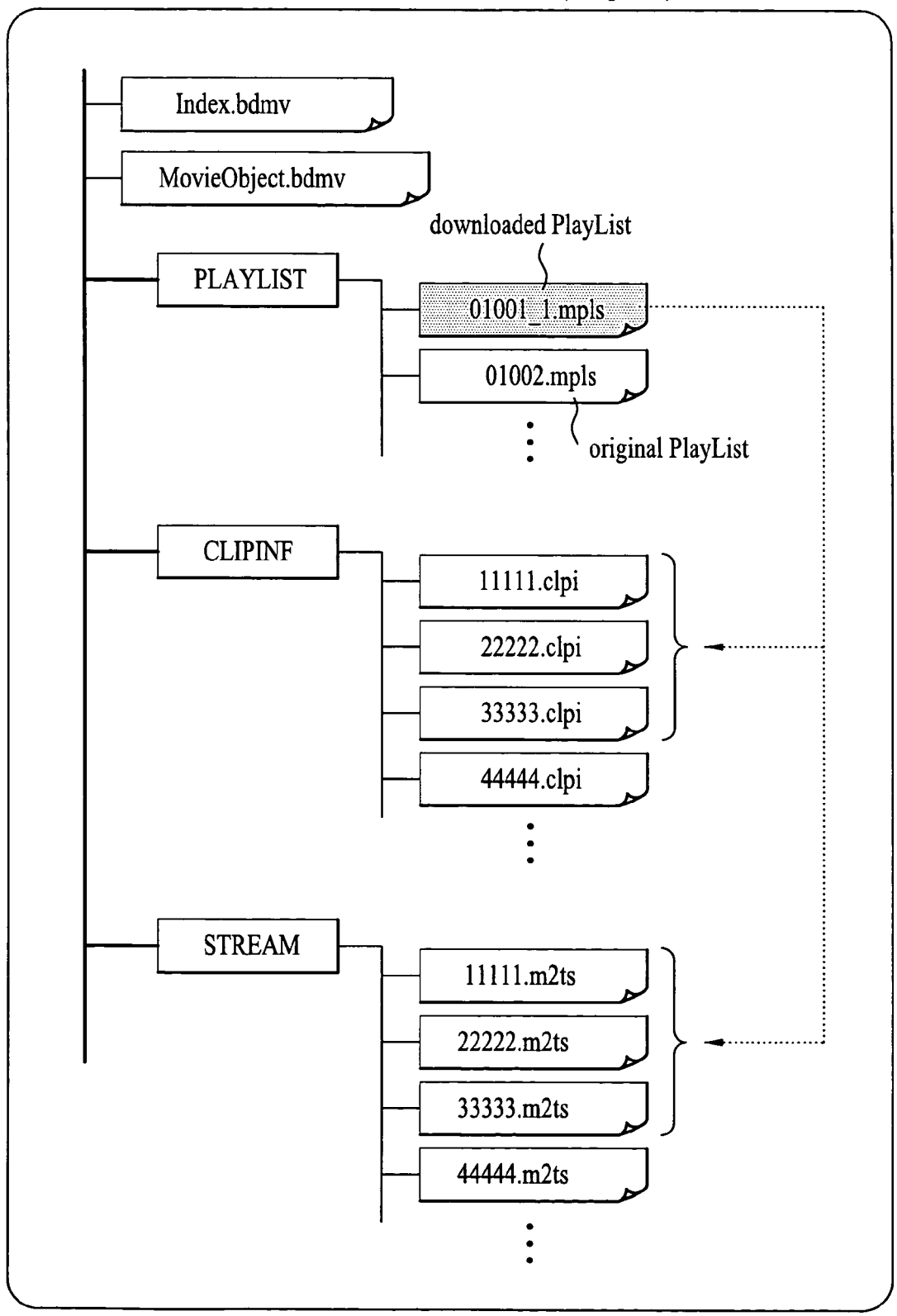

FIGS. 13A to 13C show a preferred embodiment in which the original playlist is replaced with the downloaded playlist. In the same manner as in FIG. 12A, the preferred embodiment shown in FIGS. 13A to 13C downloads only reproduction management information (e.g., the downloaded playlist) in the local storage 15, and does not download the AV stream in the local storage 15. In more detail, the preferred embodiment shown in FIGS. 13A to 13C shows a specific case in which the main data recorded in the disc is reproduced using the downloaded playlist. However, according to the preferred embodiment shown in FIG. 13A, the downloaded playlist and the original playlist reproduce the same AV stream file, but they have different IN_time (i.e., a reproduction start time) and OUT_time (i.e., a reproduction termination time) information, differently from the above-mentioned preferred embodiment shown in FIG. 12A.

FIG. 13A shows the original playlist (01001.mpls) recorded in the disc 30 and the downloaded playlist (01001_1.mpls) stored in the local storage 15. In this case, the downloaded playlist (01001_1.mpls) is associated with the original playlist (01001.mpls) The original playlist (01001.mpls) includes a plurality of playitems (PlayItem #1, PlayItem #2, and PlayItem #3) as a main path. The downloaded playlist (01001_1.mpls) includes a plurality of playitems (PlayItem #1, PlayItem #2, and PlayItem #3) as a main path.

The original playlist (01001.mpls) reproduces and manages the AV streams (AV stream #1, AV stream #2, and AV stream #3) recorded in the disc using three playitems (PlayItem #1, PlayItem #1, and PlayItem #1). The reproduction start time (IN_time) and the reproduction termination time (OUT_time) of the AV stream (AV stream #1) correspond to a predetermined interval (a~b) denoted by a dotted line. The reproduction start time (IN_time) and the reproduction termination time (OUT_time) of the AV stream (AV stream #2) correspond to a predetermined interval (c~d) denoted by a dotted line. The reproduction start time (IN_time) and the reproduction termination time (OUT_time) of the AV stream (AV stream #3) correspond to a predetermined interval (e~f) denoted by a dotted line. The downloaded playlist (01001_1.mpls) reproduces and manages AV streams (AV stream #1, AV stream #2, and AV stream #3), which are equal to those of the original playlist (01001.mpls), as main data recorded in the disc. In this case, the reproduction start time (IN_time)

and the reproduction termination time (OUT_time) of the AV stream (AV stream #1) correspond to a predetermined interval (a'~b') denoted by a solid line. The reproduction start time (IN_time) and the reproduction termination time (OUT_time) of the AV stream (AV stream #2) correspond to a predetermined interval (c'~d') denoted by a solid line. The reproduction start time (IN_time) and the reproduction termination time (OUT_time) of the AV stream (AV stream #3) correspond to a predetermined interval (e'~f') denoted by a solid line.

AV streams are not stored as sub-data in the local storage 15, and only the downloaded playlist is stored in the local storage 15. The downloaded playlist has different IN_time and OUT_time information in association with the same AV stream as compared to the original playlist, such that a desired effect that title scenario is changed or re-edited by the original playlist can be achieved.

FIG. 13B shows a reproduction management file structure contained in the local storage 15 including the downloaded playlist (01001_1.mpls). The file structure of the local storage 15 includes only the downloaded playlist (01001_1.mpls) in the playlist directory (PLAYLIST), and does not include the clip-info directory (CLIPINF) and the stream directory (STREAM).

As stated above, the, downloaded playlist (01001_1.mpls) includes the playitems (PlayItem #1, PlayItem #2, and PlayItem #3) capable of reproducing the AV streams (AV stream #1, AV stream #2, and AV stream #3) as main data of the disc, respectively. However, it should be noted that IN_time and OUT_time information of the downloaded playlist is different from that of the original playlist.

FIG. 13C shows a composite file structure, which is reproduced along with the main data using the downloaded playlist (01001_1.mpls)

In more detail, according to the composite file structure shown in FIG. 13C, the original playlist (01001.mpls) is replaced with the downloaded playlist (01001_1.mpls), and the remaining files have the same structure as the file structure recorded in the disc.

The files reproduced by the newly-replaced downloaded playlist (01001_1.mpls) are determined to be clip-info files (11111.clpi, 22222.clpi, and 33333.clpi) and stream files (11111.m2ts, 22222.m2ts, and 33333.m2ts) in the same manner as in the original playlist. However, it should be noted that IN_time and OUT_time information of the newly-replaced downloaded playlist is different from that of the original playlist.

The index file (index.bdmv) and the object file (MovieObject.bdmv) are contained in the composite file structure without any change.

FIGS. 14A to 15E hierarchically show syntaxes of a composite file structure capable of reproducing the sub-data of the local storage 15 and/or the main data of the disc.

FIG. 14A shows a syntax associated with a header part of the index file (index.bdmv). For example, specific information capable of identifying an index file, for example, "INDX" character code, is recorded in the "type_indicator" field. Information indicative of version information of the index file is recorded in the "version_number" field. The "Indexes_start_address" field records location information indicative of a file start position of the "Indexes()" field. The index file (index.bdmv) includes the "AppInfoBDMV()" field for providing information associated with a disc author; and the "Indexes()" field for indexing contents recorded in the disc, and providing a user with the indexed contents. The "Indexes()" field associated with the present invention will hereinafter be described.

FIG. 14B shows a syntax of the "Indexes()" field contained in the index file (index.bdmv). In more detail, size information of the "Indexes()" field is recorded in the "length" field. The "FirstPlayback()" field includes "FirstPlayback_mobj_id_ref" information for retrieving "mobj_id" information from the object file (MovieObject.bdmv) including a reproduction command associated with a corresponding reproduction image, such that the "TopMenu()" field provides the user with a menu image upon receiving a user menu-call command.

Information indicative of the number of titles present in the index file is recorded in the "number_of_Title" field. Based on the above-mentioned number information of the titles, a plurality of the "Title()" fields equal to the above-mentioned number information are present in the "number_of_Title" field. The "Title()" field includes "Title_mobj_id_ref" information for retrieving specific information "mobj_id" contained in the object file (MovieObject.bdmv) including a reproduction command for reproducing a corresponding title; "Title_access_type" information indicating whether a title can be searched for; and the "Title_playback_type" information indicative of attribute information of a corresponding title.

Specifically, the "Title_playback_type" information is indicative of specific information capable of classifying categories of the title. For example, "Type 1" is indicative of a main title recorded in the disc, "Type 2" is indicative of an auxiliary (Aux) title stored in the local storage, and "Type 3" is indicative of a composite title formed by combining the main data recorded in the disc and the sub-data stored in the local storage.

FIG. 14C shows a syntax associated with a header part of the movie object file (MovieObject.bdmv). In more detail, specific information capable of identifying the object file, for example, "MOBJ" character code is recorded in the "type_indicator" field. Information indicative of version information of the object file is recorded in the "version_number" field. A plurality of "mobj_id" units are contained in the "MovieObject()" field. Each "mobj_id" unit includes a specific reproduction command (also called "navigation_command" information).

In association with the above-mentioned description, a "playback_PlayList" command is used as an example of the "navigation_command" information. If a specific condition is satisfied, other commands capable of interrupting a currently-reproduced playlist simultaneously with reproducing other playlists may be used.

FIGS. 15A to 15E show a syntax of a playlist file (xxxxx.mpls) for reproducing a specific title.

FIG. 15A shows a syntax associated with a header part of the playlist file (xxxxx.mpls). For example, specific information capable of identifying a playlist file, for example, an "MLPS" character code, is recorded in the "type_indicator" field. Information indicative of version information of the playlist file is recorded in the "version_number" field. The "PlayList_start_address" field records location information indicative of a file start position of the "PlayList()" field. The "PlayListMark_start_address" field records location information indicative of a file start position of the "PlayList Mark()" field.

The playlist file (xxxxx.mpls) includes the "AppInfoPlayList()" field including information associated with a playlist playback method (PlayList_playback_type); the "PlayList()" field including playitem and sub-path information; and the "PlayListMark()" field including mark pointer information needed for special reproduction. The "PlayList ( )" field associated with the present invention will hereinafter be described.

FIG. 15B shows a header syntax of the "PlayList( )" field contained in the playlist file (index.bdmv). In more detail, size information of the "PlayList( )" field is recorded in the "length" field. Information indicative of the number of playitems present in the playlist file is recorded in the "number_of_PlayItems" field. Information indicative of the number of sub-paths present in the playlist file is recorded in the "number_of SubPaths" field.

Based on the above-mentioned number information, a plurality of the "PlayItem( )" fields equal to the above-mentioned number of the playitems and a plurality of the "Subpath( )" fields equal to the above-mentioned number of the sub-paths are present. Each "Playitem( )" field includes the "STN_table( )" field for recording all stream information usable in a corresponding playitem. When the optical recording/reproducing device 10 reproduces the "PlayItem( )" field and the "SubPath( )" field associated with the "PlayItem( )" field, it selects and reproduces the stream information defined in the "STN_table( )" field. Therefore, all stream information shown in FIGS. 6A to 13C is recorded in the "STN_table( )" field.

The syntax associated with the "STN_table" field in the "PlayItem( )" field will hereinafter be described with reference to FIGS. 15C to 15E.

FIG. 15C shows a header syntax of the "STN_table( )" field contained in the "PlayItem( )" field. In more detail, size information of the "STN_table( )" field is: recorded in the "length" field. Information indicative of the number of reproducible video streams associated with the playitem is recorded in the "number_of_audio_stream_entries" field. Information indicative of the number of reproducible text-subtitle-streams associated with the playitem is recorded in the "number_of_PG_textST_stream_entries" field. Information indicative of the number of reproducible interactive graphic streams associated with the playitem is recorded in the "number_of IG_stream_entries" field.

Based on the above-mentioned number information, stream information equal to the number of the streams is recorded. Each stream information is classified into the "stream_entry" field for recording stream type information, main clip information, or sub-clip information, and the. "stream_attributes( )" field for recording attribute information of the stream.

Figure 15D:
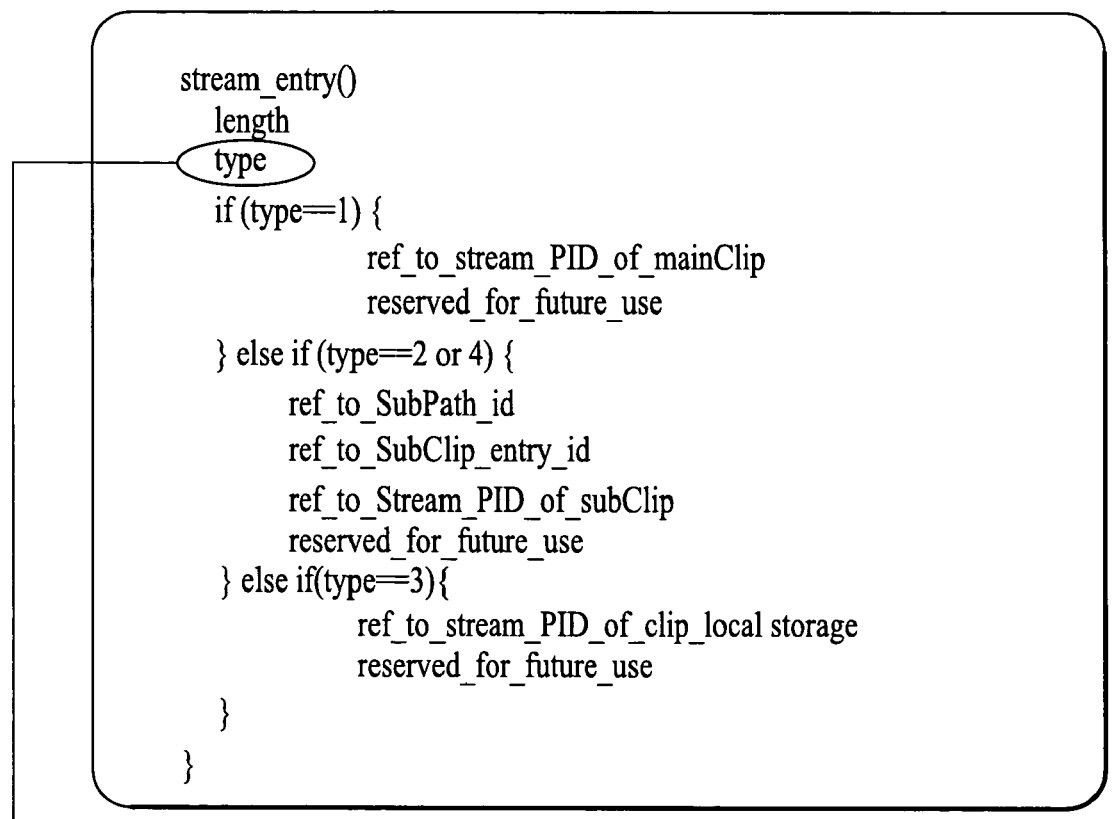

FIG. 15D shows a syntax of the "stream_entry" field contained in the "STN_table( )" field. In more detail, size information of the "stream_entry ( )" field is recorded in the "length" field. Source information of a corresponding stream is recorded in the "type" field. For example, the "type 1" information acting as a stream determined by the playitem is indicative of a stream contained in a main clip. The "type 2" information determined by a sub-path is indicative of a stream recorded in the disc. The "type 3" information determined by the playitem is indicative of a stream stored in the local storage 15. The "type 4" information determined by the sub-path is indicative of a stream stored in the local storage 15.

Although the above-mentioned preferred embodiments shown in FIGS. 6A to 13C exemplarily show only a first case in which all the streams are reproduced by the playitem contained in the main path, a second case in which the streams are reproduced as a sub-playitem caused by a sub-path may also be present. Therefore, the above-mentioned second case is considered when the "type" information of individual streams is defined.

Therefore, if the type of the current "stream_entry( )" field is set to "1", PID (Packet ID) information of a corresponding main clip is recorded in the "ref_to_stream_PID_of main-clip" field.

If the type of the current "stream_entry( )" field is set to "2" or 4", PID information of a corresponding sub-clip is recorded in the "ref_to_stream_PID_of_subclip" field. If there are a plurality of sub-paths, specific information capable of identifying individual sub-paths is recorded in the "ref_to_SubPath_id" field. Also, information capable of identifying a corresponding sub-clip is recorded in the "ref_to_Subclip_entry_id" field.

If the type of the current "stream_entry( )" field is set to "3", PID information of a corresponding local storage is recorded in the "ref_to_stream_PID_of_clip_in_local-storage" field.

FIG. 15E shows a syntax of the "stream_attributes ( )" field contained in the "STN_table( )" field. In other words, size information of the "stream attributes" field is recorded in the "length" field, and category information of a corresponding stream is recorded in the "stream_coding_type" field.

For example, if the "stream_coding type" field is set to "0x02", this means that a current stream is a video stream (e.g., an MPEG2 video stream), the "frame-rate" field is used as attribute information.

If the "stream coding type" field is set to "0x80", "0x81" or "0x82", this means that a current stream is an audio stream, and the "audio_presentatin_type, field and the "audio language code" field are used as attribute information. In this case, the "audio_presentatin_type" field records information indicative of the number of channels generated during a reproduction, time of an audio signal, and the "audio_presentation_code" field records language information of the audio stream.

If the "stream_coding_type" field is set to "0x90", this means that a current stream is a prsentation graphic stream, and the "PG language code" field for recording presentation graphic language information is used as attribute information.

If the, "stream coding_type, field is set to "0x91", this means that a current stream is an interactive graphic stream, and the "IG_language_code" field for recording interactive graphic language information is used as attribute information.

If the "stream_coding_type" field is set to "0x92", this means that a current stream is a text subtitle stream, and the "textST_language_code" field for recording text subtitle language information is used as attribute information, and the "character_code" field for recording character code information of a text subtitle is used as such attribute information.

In association with the above-mentioned description, FIG. 15E shows a representative example of only limited attribute information for every stream, and it is obvious that various attribute information may be used for individual stream categories.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for configuring a composite file structure for data reproduction, the method comprising:
   forming, at a device, the composite file structure managing main data recorded in a recording medium and sub data stored in a local storage while being associated with the main data, wherein the composite file structure includes a downloaded playlist for reproducing the main data and the sub data.

2. The method according to claim 1, wherein the downloaded playlist includes at least one playitem for reproducing the main data, and at least one playitem for reproducing the sub data.

3. The method according to claim 1, wherein the main data includes at least one main title composed of an audio-video (AV) stream wherein video data, audio data, and graphic data are multiplexed.

4. The method according to claim 1, wherein the sub data includes an audio-video (AV) stream wherein video data, audio data, and graphic data are multiplexed, and includes an auxiliary (Aux) title associated with the main title.

5. The method according to claim 4, wherein the auxiliary (Aux) title substitutes for all parts of the main title.

6. The method according to claim 4, wherein the auxiliary (Aux) title is a title newly added to the main title.

7. A method for configuring a composite file structure for data reproduction, wherein the composite file structure manages main data recorded in a recording medium and sub data stored in a local storage while being associated with the main data, the method comprising:
independently incorporating, at a device, an original playlist for reproducing the main data and a downloaded playlist for reproducing the sub data into the composite file structure.

8. A method for configuring a composite file structure for data reproduction, wherein the composite file structure, manages main data recorded in a recording medium and sub data stored in a local storage while being associated with the main data, the method comprising the step of:
incorporating, at a device, a composite playlist formed by combining an original playlist and a downloaded playlist into the composite file structure, such that the main data and the sub data are simultaneously reproduced.

9. The method according to claim 8, wherein the downloaded playlist includes at least one playitem for reproducing only the sub data stored in the local storage.

10. The method according to claim 8, wherein the main data includes at least one main title composed of an audio-video (AV) stream wherein video data, audio data, and graphic data are multiplexed.

11. The method according to claim 10, wherein the sub data includes an audio-video (AV) stream wherein video data, audio data, and graphic data are multiplexed, and includes an auxiliary (Aux) title associated with the main title.

12. The method according to claim 11, wherein the auxiliary (Aux) title substitutes for some parts of the main title.

13. The method according to claim 11, wherein the auxiliary (Aux) title is a title newly added to the main title.

14. The method according to claim 11, wherein the auxiliary (Aux) data partially changes contents of the main title.

15. The method according to claim 11, wherein the auxiliary (Aux) title is composed of only a video stream.

16. A method for configuring a composite file structure for data reproduction, the method comprising:
forming at a device, the composite file structure using main data recorded in a recording medium, one or more original playlists for reproducing the main data, and a downloaded playlist stored in the a storage,
wherein
the composite file structure includes a downloaded playlist substituted for one of the original playlist.

17. The method according to claim 16, wherein the downloaded playlist includes at least one playitem for reproducing the main data and the sub-data associated with the main data.

18. The method according to claim 16, wherein the downloaded playlist includes at least one playitem for reproducing the main data, and the original playlist includes at least one playitem for reproducing the main data.

19. The method according to claim 18, wherein structure information of the playitem contained in the downloaded playlist is different from that of the playitem contained in the original playlist.

20. The method according to claim 18, wherein a reproduction start time (IN_time) and a reproduction termination time (OUT_time) according to the playitem of the downloaded playlist are different from at least one of a reproduction start time (IN_time) and a reproduction termination time (OUT_Time) according to the playitem of the original playlist.

21. The method according to claim 16, wherein the main data reproduced by the downloaded playlist and the main data reproduced by the original playlist have different reproduction scenarios.

22. A method for reproducing data, comprising:
recognizing identification (ID) information of a recording medium recording main data;
determining whether sub-data having the same ID as that of the recording medium is present in a local storage;
configuring, at a device, a composite file structure for simultaneously reproducing the main data and the sub data if the sub data is present in the local storage; and
reproducing the main data and the sub-data using the configured composite file structure,
wherein the configured composite file structure includes a downloaded playlist for reproducing the main data and the sub data.

23. The method according to claim 22, wherein the configured composite file structure independently includes an original playlist for reproducing the main data and a downloaded playlist for reproducing the sub data.

24. The method according to claim 22, wherein the configured composite file structure includes a composite playlist formed by combining an original playlist and a downloaded playlist in the composite file structure, such that the main data and the sub data are simultaneously reproduced.

25. The method according to claim 22, wherein the configured composite file structure includes a downloaded playlist substituted for one of a plurality of original playlists.

26. An apparatus for reproducing data, comprising:
a pickup unit configured to read main data from a recording medium;
a local storage configured to store sub data associated with the main data;
a decoder configured to decode the main data and the sub data; and
a controller configured to form a composite file structure and control the decoder using the configured composite file structure, such that the main data and the sub data are simultaneously reproduced,
wherein the composite file structure includes a downloaded playlist for reproducing the main data and the sub data.

27. A method for configuring a composite file structure for data reproduction, wherein the composite file structure manages main data recorded in a recording medium and sub data stored in a local storage while being associated with the main data, the method comprising:

substituting a playlist file recorded in the recording medium with a downloaded playlist file.

28. A method for configuring a composite file structure for data reproduction, wherein the composite file structure manages main data recorded in a recording medium and sub data stored in a local storage while being associated with the main data, the method comprising: adding a downloaded playlist file to the composite file structure.

29. A method for reproducing data, comprising:
recognizing identification (ID) information of a recording medium in which main data is recorded;
determining whether sub data having the same ID as that of the recording medium is present in a local storage;
forming, at a device, a composite file structure for reproducing the main data and the sub data; and
reproducing the main data and the sub data using the configured composite file structure,
wherein the forming a composite file structure includes substituting a playlist file recorded in the recording medium with a downloaded playlist file.

30. A method for reproducing data, comprising the steps of:
recognizing identification (ID) Information of a recording medium in which main data is recorded, and determining whether sub data having the same ID as that of the recording medium is present in a local storage;
forming, at a device, a composite file structure for reproducing the main data and the sub data; and
reproducing the main data and the sub data using the configured composite file structure,
wherein the forming a composite file structure includes adding a downloaded playlist file to the composite file structure.

31. An apparatus for reproducing data, comprising:
a pickup unit configured to read main data from a recording medium;
a local storage configured to store sub data associated with the main data;
a decoder configured to decode the main data and the sub data; and
a controller configured to form a composite file structure and control a decoding process of the decoder using the composite file structure,
wherein the controller substitutes a playlist file recorded in the recording medium with a downloaded playlist file.

32. An apparatus for reproducing data, comprising:
a pickup unit configured to read main data from a recording medium;
a local storage configured to store sub data associated with the main data;
a decoder configured to decode the main data and the sub data; and
a controller configured to form a composite file structure, and controlling a decoding process of the decoder using the composite file structure,
wherein the controller adds a downloaded playlist file to the composite file structure.

* * * * *